(12) United States Patent
Mizunoya et al.

(10) Patent No.: US 6,209,879 B1
(45) Date of Patent: Apr. 3, 2001

(54) SEALING APPARATUS

(75) Inventors: Koichi Mizunoya; Ken Yoshikawa; Satoshi Yamanaka; Tatuhiko Watanabe; Shinobu Munekata, all of Fukushima; Yasuhiro Ikeda, Okayama-ken, all of (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 09/177,489

(22) Filed: Oct. 23, 1998

(30) Foreign Application Priority Data

| Oct. 24, 1997 | (JP) | ................................................ 9-309522 |
| Dec. 26, 1997 | (JP) | ................................................ 9-369492 |
| Dec. 26, 1997 | (JP) | ................................................ 9-369598 |
| Oct. 21, 1998 | (JP) | ............................................. 10-318388 |

(51) Int. Cl.$^7$ ..................................................... F16J 15/32
(52) U.S. Cl. ......................... 277/353; 277/152; 277/134; 277/402; 277/394
(58) Field of Search ..................................... 277/394, 402, 277/353, 549, 552

(56) References Cited

U.S. PATENT DOCUMENTS

| 3,482,845 | 12/1969 | Bertrandi et al. . | |
| 3,633,927 | * 1/1972 | Van Deven | ........................... 277/134 |
| 4,195,854 | * 4/1980 | Bertin | .................................... 277/153 |
| 4,550,920 | * 11/1985 | Matsushima | ........................... 277/134 |
| 4,834,397 | * 5/1989 | Shinasaki | .............................. 277/152 |
| 5,183,271 | * 2/1993 | Wada | .................................... 277/152 |
| 5,346,662 | 9/1994 | Black et al. . | |
| 5,607,168 | 3/1997 | Dahll . | |
| 5,860,656 | * 1/1999 | Obata | .................................... 277/559 |
| 5,915,696 | * 6/1999 | Onuma | .................................. 277/559 |

FOREIGN PATENT DOCUMENTS

| 1 525 486 | 1/1969 | (DE) . |
| 36 40 346 A1 | 6/1988 | (DE) . |
| WO 9429622 | 3/1995 | (WO) . |

* cited by examiner

Primary Examiner—Anthony Knight
Assistant Examiner—Mark Williams
(74) Attorney, Agent, or Firm—Armstrong, Westerman, Hattori, McLeland & Naughton

(57) ABSTRACT

A sealing apparatus has a metal ring having a cylindrical portion and an inward flange portion bending from the open-air side end of the cylindrical portion radially inward; a first sealing member formed integral with the metal ring, and having a first rubber-like sealing lip, and a flange-shaped interposed portion held between the inward flange position of the metal ring and the radial portion of the first sealing member. A second sealing member made of a resin material, extends from the inside-diameter end of the interposed portion axially toward the sealing liquid side, and is located in a gap between the open-air side surface of the first sealing lip and a rotary member, having the inner periphery thereof in slidable close contact with the surface of the rotary member, and regulates radial deformation of the first sealing lip. A screw pumping portion is provided to transport the liquid between the sliding surfaces to the sealing liquid side on rotation of the rotary member.

11 Claims, 8 Drawing Sheets

SEALING APPARATUS

BACKGROUND OF THE INVENTION

1. Field of the Invention

The present invention relates to a sealing apparatus used in a shaft sealing section of various devices and appliances, particularly a sealing apparatus provided with a sealing lip made of a rubber-like elastic material and a sealing lip made of a resin.

2. Description of the Related Art

A conventional sealing apparatus of this type comprises a metal ring having a cylindrical portion and an inward flange portion folded from the open-air side end of this cylindrical portion radially inward, a first sealing member, made of a rubber-like elastic material, formed integral with the metal ring, and a second sealing member, made of a resin material, held between the inward flange portion of the metal ring and the first sealing member. The first sealing member has a first sealing lip which extends to the axial direction sealing liquid side and has a lip leading end slidably in sealing contact with the surface of a rotary member. The second sealing member has a second sealing lip which is located in a gap between the open-air side surface of the first sealing lip and the rotary member and has an inner periphery slidably in sealing contact with the surface of the rotary member.

The second sealing lip made of resin supports the first sealing lip, and inhibits an excessive deformation of the first sealing lip when pressure of the sealing liquid becomes excessively high. Double sealing is ensured by the first sealing lip and the second sealing lip by causing the inner periphery of the second sealing lip to come into sealing contact with the rotary member.

In the conventional art as described above, however, the first sealing lip made of rubber is easily susceptible to wear, and cannot sufficiently prevent leakage of the sealing liquid.

Leakage of the liquid having leaked from the first sealing lip on the open air side is prevent to some extent by the second sealing lip of resin. However, the main role of the second sealing ring made of resin is to inhibit deformation of the first sealing lip made of rubber, resulting in an insufficient sealing property.

The second sealing lip made of resin, requiring rigidity to some extent with a view to fully causing it to display the deformation inhibiting function of the first sealing lip, is poor in flexibility and has only an insufficient follow-up property relative to axial eccentricity of the rotary member.

Since the first sealing lip has a foot shape which permits only drawing a curvature simply from the radial direction to the axial direction, the bend at the foot of the second sealing lip made of resin bending along such a curvature has only a small degree of freedom of bending.

This causes an increase in tension with the rotary member upon occurrence of axial eccentricity, accelerating wear, and produced wear powder of the resin causes deposition of sludge. This forms a cause of occurrence of liquid leakage from interruptions of the lip line of the second sealing lip made of resin.

The deformation inhibiting function of the first sealing lip provided by the second sealing lip made of resin is limited to a certain extent, and deformation of the first sealing lip under a high sealing liquid pressure cannot sufficiently be inhibited.

SUMMARY OF THE INVENTION

The present invention was developed to solve the above-mentioned problems in the conventional art, and has an object to provide a sealing apparatus having a simple configuration and excellent in air-tightness.

Another object of the invention is to provide a sealing apparatus capable of improving eccentricity follow-up property of a second sealing lip made of a resin.

Still another object of the invention is to provide a manufacturing method of a sealing apparatus which facilitates fabrication of the second sealing lip, permits high-accuracy assembly in the manufacturing process, and allows to display a satisfactory sealing property.

To achieve the above objects, the present invention provides, in one aspect, a sealing apparatus, which is applied to a rotary member, comprising:

- a metal ring having a cylindrical portion and an inward flange portion extending radially inward from an open-air side end of the cylindrical portion;
- a first sealing member made of a rubber-like elastic material, the first sealing member having a radial portion connected to the cylindrical portion and disposed to a portion opposing to the inward flange portion of the metal ring and a first sealing lip axially extending from the radial portion to a sealing liquid side and having a lip leading end tightly contacting a surface of the rotary member to be slidable;
- a second sealing member made of a resin material, and having a flange-shaped interposed portion held between the inward flange portion of the metal ring and the radial portion of the first sealing member and a second sealing lip extending from an inner-diameter end portion of the flange-shaped interposed portion towards the axial sealing liquid side and being positioned in a gap defined between the open-air side of the first sealing lip and the rotary member so that an inner peripheral portion thereof tightly contacts the surface of the rotary member to be slidable;
- a first screw pump means provided on a sliding surface of the first sealing lip and adapted to provide a pumping function for transporting a liquid between sliding surfaces under an effect of a rotational sliding motion to the rotary member; and
- a spiral or ring-shaped slit groove formed on the sliding surface of the second sealing member.

Therefore, even when wear of the first sealing lip progresses and the sealing liquid leaks to the open-air side, the liquid is pushed back by the first pump acting portion. Further, when the liquid leaks from the first sealing lip to the open air side, seal is provided by the spiral slit groove or a plurality of annular slit grooves arranged on the sliding surface of the second sealing lip. In the case of the spiral slit groove, the liquid is returned to the sealing side by the action of the screw pump. In the case of the annular slit grooves, on the other hand, a peak of surface pressure occurs for each slit groove, and this provides a higher sealing property than in the type with no groove.

Formation of the slit groove(s) on the sliding surface of the second sealing lip leads to a decrease in rigidity of the second sealing lip under the effect of the slit groove(s) and a higher follow-up property for the axial eccentricity of the second sealing lip. Because this configuration comprises only slits (cuts), even forming in a spiral shape can give a high sealing property at standstill. When annular slit grooves are formed it is possible to completely seal leakage at standstill.

The first screw pump acting portion should preferably have a configuration in which a plurality of screw slots inclining in opposite directions relative to a plane including a center axis are arranged in the circumferential direction, and a spiral slit groove should preferably be provided on the second sealing lip.

This combination is selected for improving sealing properties including durability.

More specifically, the screw slots inclining in the opposite directions of the first sealing lip displays a pumping function for rotation in the both directions of the rotary member. The screw slots has an object to increase the amount of pumping, and the amount of pumping is larger in the one-direction screw than in the two-direction screw [amount of pumping: one-direction screw>two-direction screw>no screw]. Wear resistance is the most excellent in the absence of screw, followed by the two-direction screw and then the one-direction screw, in this order (wear resistance: one-direction screw<two-direction screw<no screw). For the first sealing lip made of rubber, therefore, the two-direction screw giving a good balance between the amount of pumping and wear resistance is selected.

The spiral slit groove of the second sealing lip, on the other hand, in which sealing is in only one direction, provides an advantage of improving sealing property, with a larger amount of pumping.

When a plurality of annular slit grooves are provided at a prescribed pitch in the axial direction as slit grooves of the second sealing lip, the plurality of annular grooves produce many surface pressure peaks, and a satisfactory sealing property is displayed. Provision of annular grooves brings about an advantage of applicability to both-direction rotation.

It is appropriate to form the spiral slit groove or the annular slit grooves on the second sealing lip from the sliding surface of the second sealing lip to the bend leading to the interposed portion.

By so doing, flexibility of the bend of the second sealing lip is improved, ensuring easy bending, following up an axial eccentricity. As a result, it is possible to prevent tension from increasing even upon occurrence of an axial eccentricity of the rotary member.

The spiral slit groove or the annular slit grooves should preferably have an inclination angle to the sliding surface within a range of from 35 to 75°, and a groove depth of up to 75% of the lip thickness.

This results in an excellent sealing property and permits reduction of tension.

A large inclination angle of the slit groove leads to easy occurrence of burrs or fall-off at the inner diameter portion of the second sealing lip at the beginning of slitting. With a smaller angle, on the other hand, it is impossible to fabricate. Considering these points, the inclination angle of the slit grooves should preferably be within a range of from 35 to 75°.

Since a large groove depth results in shortage of strength of the second sealing lip itself made of a resin, the groove depth should preferably be set at a value of up to 75% of the lip thickness.

By providing an annular recess on the radial portion of the first sealing member at a position opposite to the bend from the interposed portion of the second sealing member to the second sealing lip, it is possible to obtain a higher degree of freedom without a restriction on deformation of the bend of the second sealing lip, permitting a large curvature from the foot of the bend, and to improve eccentricity follow-up property relative to the rotary member.

The apparatus of the invention should preferably have an auxiliary metal ring held between the interposed portion of the second sealing member and the radial portion of the first sealing member, and the auxiliary metal ring should preferably have a support inserted between the first sealing lip and the second sealing lip and supporting the first sealing lip.

Supporting thus the first sealing lip by means of the auxiliary metal ring inhibits deformation of the first sealing lip even with a high pressure of the sealing liquid, and maintains satisfactory contact condition of the lip leading end with the rotary member.

When a communicating portion achieving communication between the first sealing member and the second sealing member is provided on this auxiliary metal ring, the rubber-like elastic material entering the communicating portion during forming directly bonds the first sealing member and the second sealing member via the communicating portion. By partially providing the rubber-like elastic material in the communicating portion certainly fixes the auxiliary metal ring and the first sealing member in the circumferential direction.

The interposed portion of the second sealing member is bonded and fixed to the radial portion of the first sealing member. It may on the other hand be non-bonded to, and separable from, the flange portion of the metal ring, or may be bonded and fixed thereto.

By leaving the interposed portion of the second sealing member non-bonded to the flange portion of the metal ring, it is possible to prevent rotation of the second sealing member. Further, by imparting a certain degree of freedom of deformation not only to the second sealing lip and the interposed portion in axial eccentricity of the rotary member, it is possible to improve eccentricity follow-up property of the second sealing lip, thereby improving sealing property of the sealing apparatus.

When the interposed portion of the second sealing member is not bonded to the flange portion of the metal ring, the frictional force with the second sealing lip upon insertion of the rotary member causes the inside-diameter end of the interposed portion of the second sealing lip to be pulled in an inserting direction of the rotary member, and this may produce a gap between the inward flange portion of the metal ring and the interposed portion of the second sealing member. This may in turn cause a shift of the second sealing lip from a set value toward the sealing liquid side which expands the diameter of the first sealing lip pushed by the second sealing lip, producing a gap from the rotary member, thus resulting in a lower sealing performance.

From such a point of view, the interposed portion of the second sealing member should preferably be bonded and fixed to the radial portion of the first sealing member, and bonded and fixed to the flange portion of the metal ring.

In this configuration, even when, upon insertion of the rotary member, there acts a frictional force of pulling in the second sealing lip in the inserting direction, the interposed portion bonded and fixed to the inward flange portion of the metal ring regulates deformation of the interposed portion, thus preventing the second sealing lip from shifting in the inserting direction of the rotary member. It is therefore possible to bring the second sealing lip into contact at a set position value, and prevent floating of the first sealing lip, thus permitting improvement of sealing performance.

Because the inside-diameter side bend of the interposed portion of the second sealing member is not bonded, on the other hand, it has a freedom of deformation to some extent to axial eccentricity of the rotary member, an eccentricity follow-up property can be ensured to some extent.

Furthermore, to achieve the above objects, according to the present invention, there is provided, in another aspect, a method of manufacturing a sealing apparatus which comprises: a metal ring having a cylindrical portion and an inward flange portion extending radially inward from an open-air side end of the cylindrical portion; a first sealing member made of a rubber-like elastic material, the first sealing member having a radial portion connected to the cylindrical portion and disposed to a portion opposing to the inward flange portion of the metal ring and a first sealing lip axially extending from the radial portion to a sealing liquid side and having a lip leading end tightly contacting a surface of the rotary member to be slidable; a second sealing member made of a resin material, and having a flange-shaped interposed portion held between the inward flange portion of the metal ring and the radial portion of the first sealing member and a second sealing lip extending from an inner-diameter end portion of the flange-shaped interposed portion towards the axial sealing liquid side and being positioned in a gap defined between the open-air side of the first sealing lip and the rotary member so that an inner peripheral portion thereof tightly contacts the surface of the rotary member to be slidable; a first screw pump means provided on a sliding surface of the first sealing lip and adapted to provide a pumping function for transporting a liquid between sliding surfaces under an effect of a rotational sliding motion to the rotary member; and a spiral or ring-shaped slit groove formed on the sliding surface of the second sealing member, the manufacturing method comprising the steps of:

providing, in a forming mold, a guide section for guiding an inner periphery of a resin plate formed into a flat washer shape for forming the second sealing member;

opening the forming mold;

inserting the metal ring in the opened forming mold with the inward flange portion thereof directed downward;

inserting the resin plate of the flat washer shape plate formed into the flat washer on the inward flange portion so as to position the inner-diameter end thereof through a guidance of the guide section;

charging a rubber-like elastic raw material in the forming mold;

closing the forming mold; and pressing and heating the forming mold to thereby form the first and second sealing members.

According to the aforementioned manufacturing method of the invention, fabrication of the second sealing member is made easier, and a satisfactory sealing property is available through high-accuracy assembly of the second sealing member in the forming process.

It is also possible to improve productivity in the manufacturing process of the sealing apparatus, and further, to reduce the cost.

DESCRIPTION OF THE PREFERRED EMBODIMENTS

Preferred embodiments of the present invention will now be described in detail with reference to the drawings. The size, the material, the shape and the relative arrangement of components described in the following embodiments are not intended limit the scope of the invention thereto unless specifically mentioned to that effect.

Figure 1:
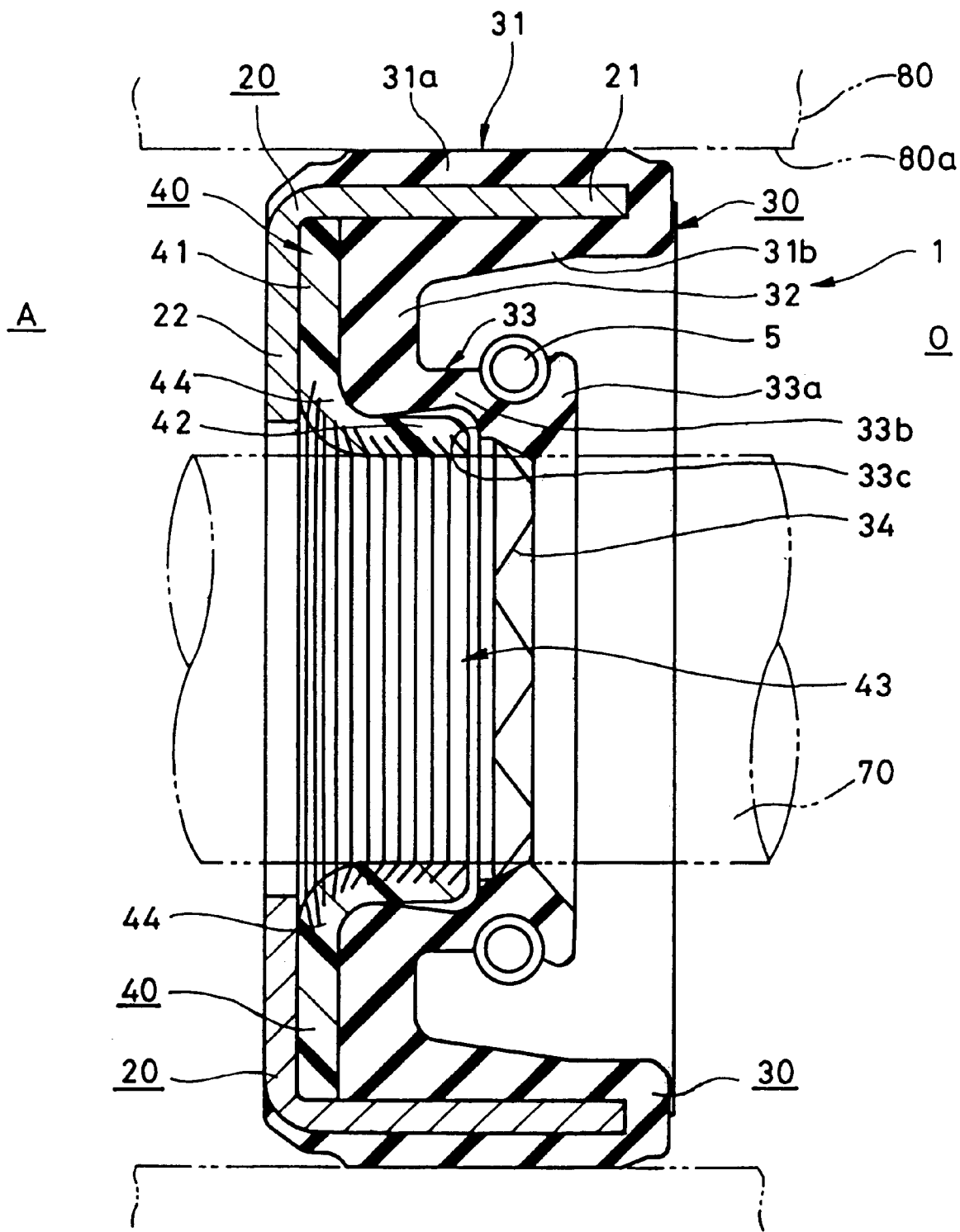
FIG. 1 is a schematic longitudinal sectional view of a sealing apparatus of a first embodiment of the present invention.
Figure 2:
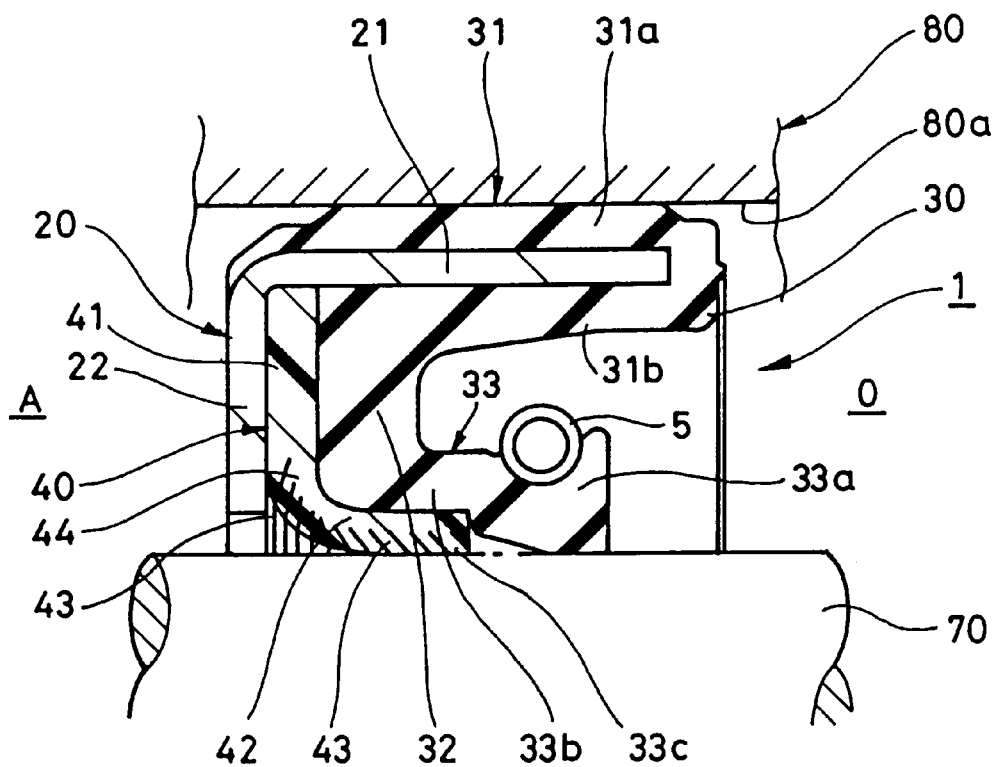
FIG. 2 is a partial sectional view of the sealing apparatus shown in FIG. 1 in attached state.

FIGS. 1 and 2 illustrate a sealing apparatus of a first embodiment of the invention.

As shown in FIGS. 1 and 2, a sealing apparatus 1 has a configuration in which leakage of a liquid on the sealing liquid side 0 such as an oil onto the open-air side A by sealing an annular gap between a rotation shaft 70 serving as a rotary member and a housing 80 serving as a stationary member provided with a cylindrical attachment hole 80a receiving insertion of the rotation shaft 70.

The sealing apparatus schematically comprises a metal ring 20, a first sealing member 30 formed integral with the metal ring 20, and a second sealing member 40 held between the metal ring 20 and the first sealing member 30.

The metal ring 20 is an annular member having substantially an L-shaped cross-section, and has a cylindrical portion 21 which is arranged concentrically with the rotation shaft 70 and the housing 80 upon assembly, and an inward flange portion 24 which extends from an end of the cylindrical portion 21 (open-air side end upon assembly) radially inward (direction toward the shaft 70).

The first sealing member 30 is an annular member made of a rubber-like elastic material formed into substantially a U-shape opening on the sealing liquid side 0, and has a radial portion 32 corresponding to the base of the U-shape, and an outer cylindrical portion 31 which extends from the outside-diameter end of the radial portion 32 to the axial-direction sealing liquid side 0, and a first sealing lip 33 which extends from the inside-diameter end of the radial portion 32 to the axial-direction sealing liquid side 0 and has a lip leading end 33a slidably in sealing contact with the surface of the rotation shaft 70.

The cylindrical portion 21 of the metal ring 20 is buried in the outer cylindrical portion 31 made of the rubber-like elastic material. Outer and inner peripheries of the cylindrical portion 21 are covered with an outer periphery rubber portion 31a and an inner periphery rubber portion 31b of the outer cylindrical portion 31. Upon assembly of the first sealing member 30 to a shaft hole 80a of a housing 80, the outer periphery rubber portion 31a comes into sealing contact with the inner periphery of the housing 80.

The radial portion 32 has substantially the same radial size as the inward flange portion 22, and the inside-diameter end thereof is located at the same position as the inside-diameter end of the inward flange portion 22.

The sealing liquid side surface of the first sealing lip 33 is connected to the sealing liquid side surface of the radial portion 32 via an arcuate corner portion. The open-air side surface of the first sealing lip 33 forms a continuous surface with the inner peripheral surface of the radial portion 32. The angle portion between the inner peripheral surface of the radial portion 32 and the open-air side surface is formed into an arcuate shape. The radial portion 32 has an axial thickness substantially equal to the length of the first sealing lip 33.

A first screw slot 34 serving as the first screw pump acting portion having a pump function of transporting the liquid to the sealing liquid side 0 through rotating sliding with the rotation shaft 70 is provided on the sliding surface of the lip leading end 33a of the first sealing lip 33.

The inner periphery of the lip leading end 33a is formed into a shape having a triangular cross-section projecting radially inward, and the apex is in contact with the entire periphery of the rotation shaft surface to seal the same. A screw slot 34 is provided on the open-air side slant beyond the apex. When providing the first screw slots 34 in a ʌ-shape as shown in FIG. 1, this configuration permits display of the pump function to cause the liquid to flow to the sealing liquid side 0 irrespective in which direction relative to the shaft 70 the sealing apparatus rotates.

It is needless to mention that the screw pump acting portion is not limited to the first screw slot 34, but may be in the form of a screw projection.

A spring ring 5 is appropriately attached to the outer periphery of the first sealing lip 33 to impart tension in the diameter reducing direction.

On the other hand, the second sealing member 40 is made of a resin material such as PTFE, and has a flange-shaped interposed portion 41 held between the inward flange portion 22 of the metal ring 20 and the radial portion 32 of the first sealing member 30, and a second sealing lip 42, made of a resin, which extends from the inside-diameter end of the interposed portion 41 via the bend to the axial sealing liquid side 0, is located in a gap between the open-air side surface of the first sealing lip 33 and the rotation shaft 70, and has the inner periphery thereof slidably in sealing contact with the surface of the rotation shaft 70.

In this embodiment, the radial portion 32 of the first sealing member 30 has a large thickness. A part thereof supports the inner periphery of the radial portion 32 from the bend 44 with the interposed portion 41 of the second sealing lip 42 toward the axial sealing liquid side 0, and the remaining part supports the open-air side surface of the foot portion 33b of the first sealing lip 33. The lip leading end of the second sealing lip 42 extends to a position near a jaw portion 33c of the lip leading end 33a of the first sealing lip 33.

The second sealing member 40 folds the inside-diameter end of the flat washer-shaped resin plate toward the axial sealing liquid side into a cone shape while elongating the same in the circumferential direction to form second sealing lip 42. The diameter is expanded along the surface of the rotation shaft 70 upon insertion of the rotation shaft 70, and a contact surface pressure is obtained by the elastic restoring force thereof.

A range of this second sealing lip 42 from the bend 44 located at the foot with the interposed portion 41 for a prescribed length supports the inner peripheral surface of the radial portion 32 of the first sealing member 30. Further, the leading end thereof supports a foot portion 33b of the first sealing lip 33 of the first sealing member 30. This maintains sealing property even when a high pressure is loaded on the first sealing lip 33, by preventing an excessive deformation of the first sealing lip 33.

A second screw slot 43 comprising a slit groove formed in a spiral shape, provided with a pump function of transporting the liquid between the sliding surfaces to the sealing liquid side 0 by rotation sliding with the rotation shaft 70 is provided also on the sliding surface of the second sealing lip 42.

In the case that the second screw slot 43 is formed so as to provide a spiral shape, the sealing apparatus 1 usually rotates only in a single direction relative to the shaft 70. It therefore displays the pump effect most efficiently for the rotation in a single direction when applied to a place where the sealing apparatus does not rotate so often in any other direction.

When applying the sealing apparatus to a place where rotation is in both directions, the configuration of the second screw slot 43 should preferably comprise a plurality of annular slit grooves provided at a prescribed pitch in the axial direction. When adopting the annular slit grooves, many peaks of surface pressure occurs for the individual annular grooves, thus permitting display of a satisfactory sealing property.

The second screw slot 43 covers portions ranging from the lip leading end to the bend 44. By providing the second screw slot 43 to cover the bend 44, it is possible to improve flexibility, inhibit an increase in tension of the second sealing lip 42 relative to the rotation shaft 70 upon occurrence of axial eccentricity, and prevent wear of the second sealing lip 42 by improving eccentricity follow-up property.

Figure 3:
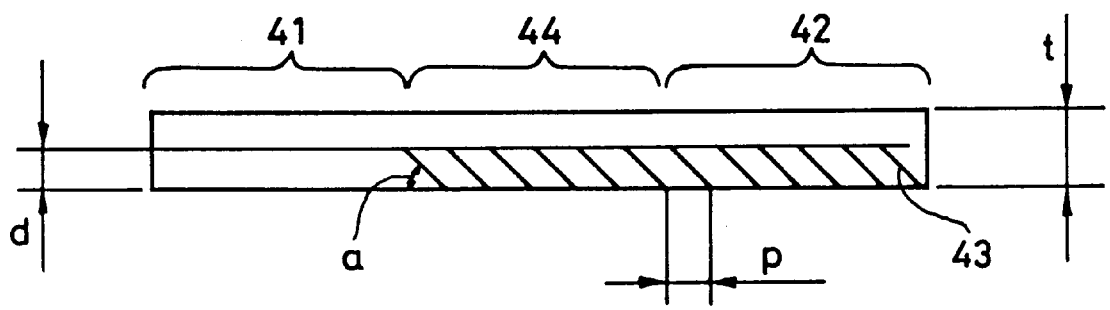
FIG. 3 is a schematic configuration diagram illustrating a single configuration of a second sealing member.

The second screw slot 43 should preferably have a depth of up to 75% of the thickness of the second sealing lip 42: an excellent pump effect is available when setting a pitch of 0.3 (mm), and inclination within a range from 35 to 75°, for example about 55° or 60°, and a depth of 0.5 mm for the second screw slot 43 as shown in FIG. 3.

Further, by setting the bending starting position of the bend 44 where folding from the interposed portion 41 toward the second sealing lip 42 is achieved at a position at a prescribed distance from the inside-diameter end of the inward flange portion 22 of the metal ring 20 toward the outside-diameter side, i.e., by adopting a configuration in which the position where the second sealing member 40 is held by the first sealing member 30 is limited on the outside-diameter side from the interposing position by the inward flange portion 22 of the metal ring 20, the degree of freedom of the second sealing lip 42 is improved, thus permitting improvement of eccentricity follow-up property.

Figure 4:
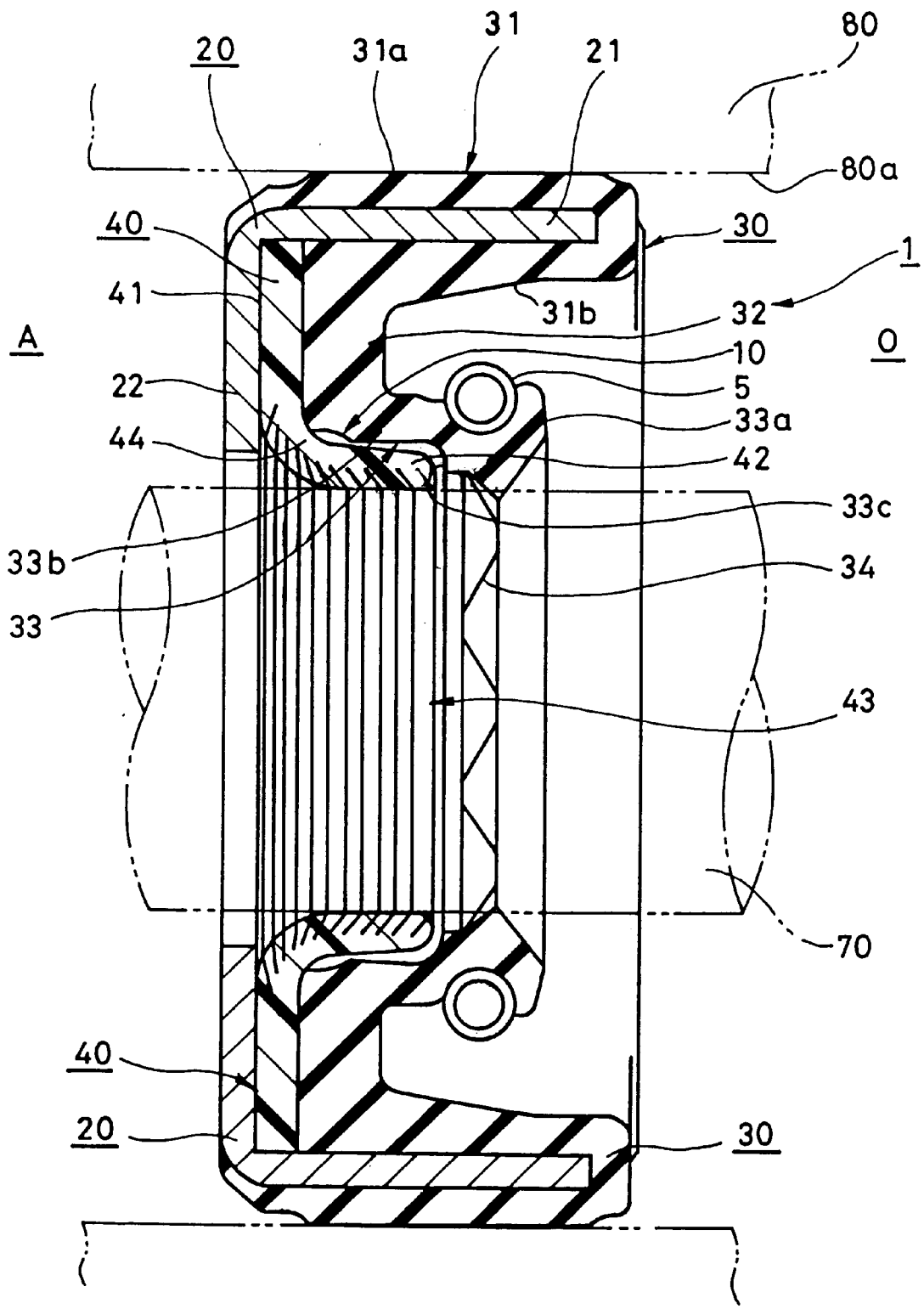
FIG. 4 is a schematic longitudinal sectional view of a variant of the apparatus shown in FIG. 1.
Figure 5:
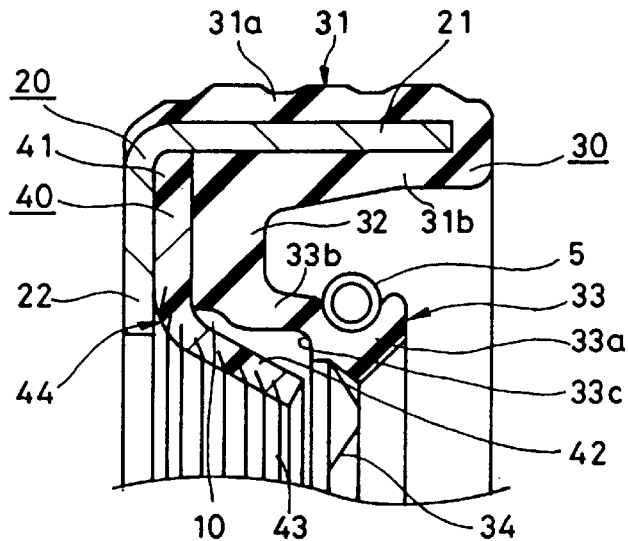
FIG. 5 is a partial sectional view of the apparatus shown in FIG. 4.

By providing an annular recess 10 on the radial portion 32 of the first sealing member 30 of the first sealing member 30 at a position opposite to the bend 44 of the second sealing member 40 as shown in FIGS. 4 and 5, a gap is formed between the bend 44 and the radial portion 32, and the second sealing lip 42 is largely bent from the foot of the bend 44 by the utilization of this gap. It is thus possible to improve follow-up property for eccentricity or axial displacement of the rotation shaft 70 as well as for swinging thereof.

In addition, because the recess 10 is provided at the position opposite to the bend 44, the first sealing member 30 is never affected by the deformation of the second sealing lip 42, and conditions including the angle of contact of the first sealing lip 33 with the rotation shaft 70 and the contact surface pressure hardly vary. The recess 10 exerts any effect on the function of the lip leading end of the second sealing lip 42 of the second sealing member 40 of supporting the foot portion 33b of the first sealing lip 33 of the first sealing member 30.

The sealing liquid side 0 surface of the interposed portion 41 of the second sealing member 40 and the open-air side A surface of the radial portion 32 of the first sealing member 30 are bonded and fixed by means of a rubber material and a resin material. On the other hand, the open-air side A surface of the interposed portion 41 of the second sealing member 40 and the sealing liquid side 0 surface of the inward flange portion 22 of the metal ring 20 may be left unbonded or may be bonded and fixed.

According to the sealing apparatus having the configuration as described above, the sealing liquid on the sealing liquid side 0 is sealed, on the housing 80 side, by the outer cylindrical portion 31 of the first sealing member 30 reinforced by the cylindrical portion 21 of the metal ring 20, and on the shaft 70 side, by the first sealing lip 33 of the first sealing member 30.

The liquid leaking from the first sealing lip 33 is brought back to the sealing liquid side 0 by the first screw slot 34 provided on the first sealing lip 33.

When the liquid is not returned but leaks in spite of the presence of the first screw slot 34, the liquid is appropriately brought back to the sealing liquid side 0 by a second screw slot 43 provided on the second sealing member 40.

It is thus possible to display a very excellent sealing property with a simple configuration.

Since the foot portion 33b of the first sealing lip 33 of the first sealing member 30 is supported by the leading end of the second sealing lip 42, it is possible to prevent the first sealing lip 33 from being turned over, and thus to maintain a stable sealing performance.

When the interposed portion 41 of the second sealing member 40 is bonded and fixed only to the radial portion 32 of the first sealing member 30 and is not bonded to the inward flange portion 22 of the metal ring 20, it is possible to improve eccentricity follow-up property of the second sealing member 40 by causing deformation not only of the second sealing lip 42 of the second sealing member 40 but also of the interposed portion 41 upon occurrence of eccentricity of the rotation shaft 70, thus improving sealing performance of the sealing apparatus 1. Stopping of rotation of the second sealing member 40 is accomplished by bonding and fixed to the radial portion 32 of the first sealing member 30.

It is needless to mention that a satisfactory eccentricity follow-up property can be ensured by bonding and fixing the interposed portion 41 of the second sealing member 40 to the radial portion 32 of the first sealing member 30, and also bonding and fixing to the inward flange portion 22 of the metal ring 20, under the effect of deformation of the bend 44 provided with the second screw slot 43. Rotation inhibition of the second sealing member 40 is accomplished by bonding and fixing both to the radial portion 32 of the first sealing member 30 and to the inward flange portion 22 of the metal ring 20, thus giving a remarkable rotation inhibiting effect.

In this embodiment, the term the deformation of the interposed portion 41 of the second sealing member 40 is used to mean a phenomenon allowing separation of the open-air side surface of the interposed portion 41 from the inward flange portion 22 caused by deflection of the radial portion 32 of the first sealing member 30 (or variation of the radius of curvature of the bend between the interposed portion 41 and the second sealing lip 42).

A manufacturing method of the sealing apparatus of the aforementioned embodiment will no be described with reference to FIG. 6A.

A sealing apparatus is manufactured by a process consisting of previously fabricating a resin plate 40A and a metal ring 20 forming the second sealing member 40 on a component parts level, and inserting the metal ring 20 and the resin plate 40A into a forming mold 91 to conduct forming integral with the first sealing member 30, this process being known as the insertion forming.

There are available three methods for producing a resin plate 40A. A first method comprises the step of previously fabricating a half the flat washer-shaped resin plate 40A on the inside-diameter side prior to mold forming into a state in which the fabricated half is bent in the axial direction into an L-shaped cross-section to form a second sealing lip 42. A second method is to use a cone-shaped resin plate cut from a cylindrical resin member into a cone-shaped washer form, perform mold forming under a forming pressure of rubber material, and forming a second sealing lip by bending. A third method consists of integrally forming an intermediate form comprising the flat washer-shaped resin plate as it is prior to forming a second sealing lip, and then forming the second sealing lip by bending.

When using the first or second method, the sealing liquid side surface of the second sealing lip forms the inner peripheral surface of a cavity, so that the open-air side surface of the first sealing lip is formed along the sealing liquid side surface of the second sealing lip.

In these method, forming cannot be carried out when the radial portion 32 of the first sealing member 30 has a recess 10 as shown in FIGS. 4 and 5, and when a second screw slot is previously formed in the resin plate, the forming pressure acts on the second screw slot, and this may destroy the second screw slot.

In this embodiment, therefore, the third method of forming the second sealing lip 42 by bending after mold forming of the intermediate form is adopted. The intermediate form is a state preceding bending of the second sealing lip of the second sealing member, in which the inside-diameter side half of the flat-washer-shaped resin plate 40 A constituting the second sealing member 40 extends radially inward.

Figure 6A:
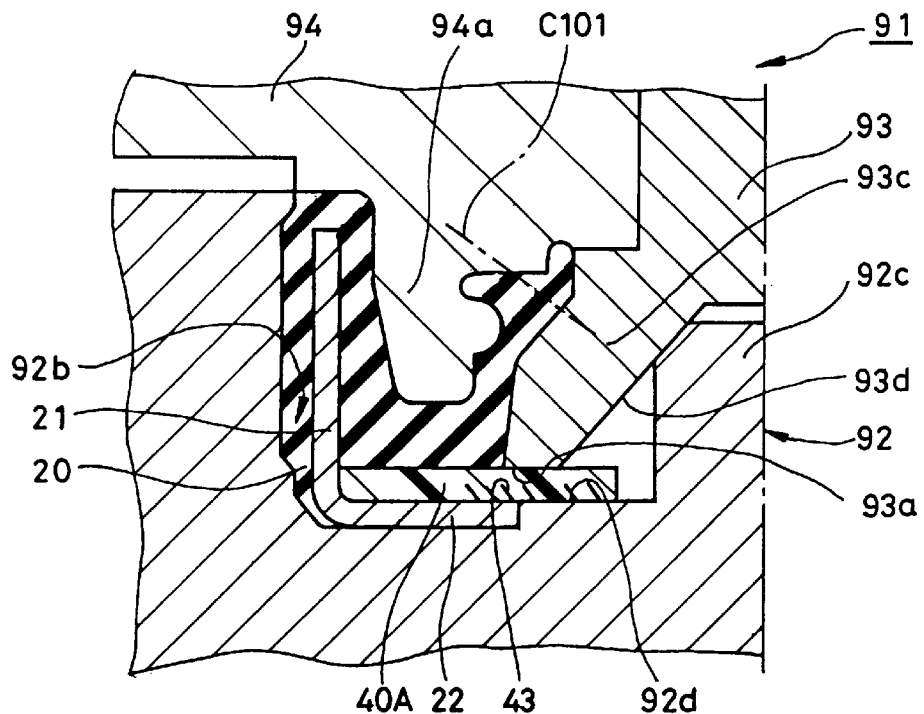
FIG. 6A is a partial longitudinal sectional view of a forming mold used for manufacturing the apparatus shown in FIG. 1.

More specifically, as shown in FIG. 6A, the resin plate 40A has previously been formed into a flat washer shape, and the spiral second screw slot 43 covers an area ranging from the inside-diameter end corresponding to the lip leading end to the middle portion corresponding to the bend.

The forming mold 91 for the intermediate form has a lower die 92 serving as a first mold component, a first upper die 93 serving as a second mold component, and a second upper die 94 serving as a third mold component.

The lower die 92 is provided with a circular recess 92b into which the metal ring 20 end the resin plate 40A are inserted, a center projection 92C projecting at the bottom center of the recess 92b, and an annular step 92d protruding from the bottom surface of the recess 91b around the center projection 92c on the bottom of the recess 92b and with which the inner periphery of the inward flange portion of the metal ring 20 is engaged.

The annular step 92d has a height agreeing with the thickness of the inward flange portion 22 so that, upon engagement with the metal ring 20, the inward flange portion 22 and the annular step 92d are flush with each other. The resin plate 40A is placed on substantially the flat surface formed by the inward flange portion 22 of the metal ring 20 and the annular step 92d, and the resin plate 40A is radially positioned through engagement of the outer periphery of the resin plate 40A with the inner periphery of the cylindrical portion 21. In the state in which the metal ring 20 and the resin plate 40A are positioned in the lower die 92, on the other hand, an annular gap is formed between the inside-diameter end of the resin plate 40A and the center projection 92c so as not to impair positioning of the resin plate 40A.

After setting the metal ring 20 and the resin plate 40A as described above, a rubber material is arranged on the resin plate 40A, and then, the first upper die 93 is inserted into the recess 92b of the lower die 92, and a first mold closing is performed.

The first upper die 93 has an inserted portion 93c inserted into the recess 92c of the lower die 92. An annular pressing surface 93a pressing the resin plate 40A on the inward flange portion 22 of the metal ring 20 placed on the bottom of the recess 92b is provided at the lower end of this inserted portion 93c. A first sealing lip open-air side surface forming portion for forming the open-air side surface of the first sealing lip 33 of the first sealing member 30 is provided on the outer peripheral surface of the inserted portion 93c. More specifically, a tapered engagement hole 93d engaging with the center projection 92c of the lower die is provided on the lower end surface of the inserted portion 93c of the first upper die 93. The aforementioned annular pressing surface 93a is provided so as to surround this engagement hole 92d. The annular pressing surface 93a of the inserted portion 93c holds the resin plate 40A between the inside-diameter side half thereof and the annular step 92d of the lower die 92 for pressing, and holds the resin plate 40A between the outside-diameter side half thereof and the inside-diameter end of the inward flange portion 22 of the metal ring 20 on the bottom of the recess 92c for pressing. Pouring of the rubber material is carried out on the boundary between the outside-diameter side half and the inside-diameter side half of the resin plate 40A located at the outside-diameter end of the pressing surface 93a.

The outer periphery of the inserted portion 93c of the lower die 92 is formed into a shape corresponding to the portion ranging from the open-air side slant of the lip leading end of the first sealing lip 33 of the first sealing member 30 through the foot portion 33b to the inner peripheral surface of the radial portion 32. In the area of the inserted portion 93c of the first upper die 93 corresponding to the lip leading end 33a of the first sealing lip 33, a screw projection corresponding to the aforementioned first screw slot 34 should preferably be provided.

Figure 6B:
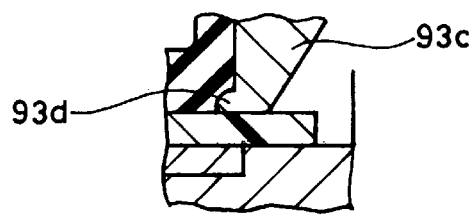
FIG. 6B is a partial sectional view of a forming mold used for manufacturing the apparatus shown in FIG. 4.

As shown in FIGS. 4 and 5, when providing an annular recess 10 at a position in the radial portion 32 of the first sealing member 30 corresponding to the bend 44 of the second sealing lip 42, it suffices to provide an annular projection 93d corresponding to the recess 10 as shown in FIG. 6B.

In this state, the second upper die 94 is closed at a prescribed speed, and the entire forming mold 91 is heated to fluidize the rubber material. The rubber material is pressed under the mold closing pressure to fill the entire cavity CV with the rubber material, thereby integrally forming the first sealing member 30 together with the metal ring 20 and the resin plate 40A. The second upper die 94 has an annular convex portion 94a for forming the side surfaces of the radial portion of the first sealing member 30 and the sealing liquid side of the first sealing lip 33 by being inserted into the recess 92b of the lower die 91.

The sealing liquid side surface of the interposed portion 41 of the second sealing member 40 and the open-air side surface of the radial portion 32 of the first sealing member 30 are bonded together during mold forming without particularly coating an adhesive. An adhesive may however be coated onto the bonded area of the resin plate 40A. When bonding the open-air side surface of the resin plate 40A and the sealing liquid side 0 surface of the inward flange portion 22 of the metal ring 20, on the other hand, it suffices to coat an adhesive onto the bonded area of the metal ring 20 or the resin plate 40A.

Upon completion of forming, the intermediate form is taken out by opening the forming mold 91. Then, the first sealing lip 33 of the first sealing member 30 is fabricated (for example, by cutting one or two cut lines C101 in the drawing), and the second sealing lip 42 of the resin plate 40A is bent while expanding the diameter of the inside-diameter end edge by inserting a lip forming jig (although not shown, a rod-shaped jig having a tapered surface).

Variant of First Embodiment

Figure 7:
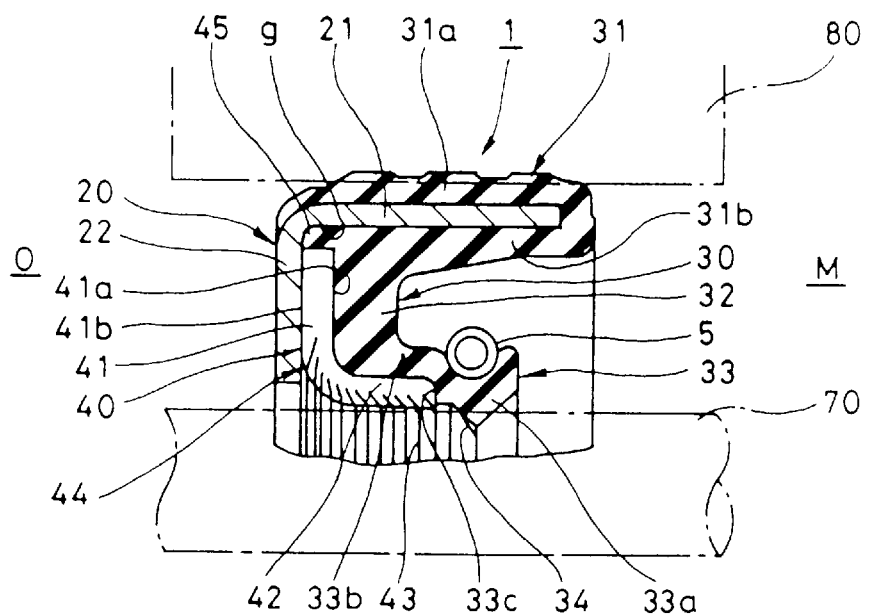
FIG. 7 is a partial sectional view illustrating a variant of the sealing apparatus of the first embodiment of the invention.
Figure 8:
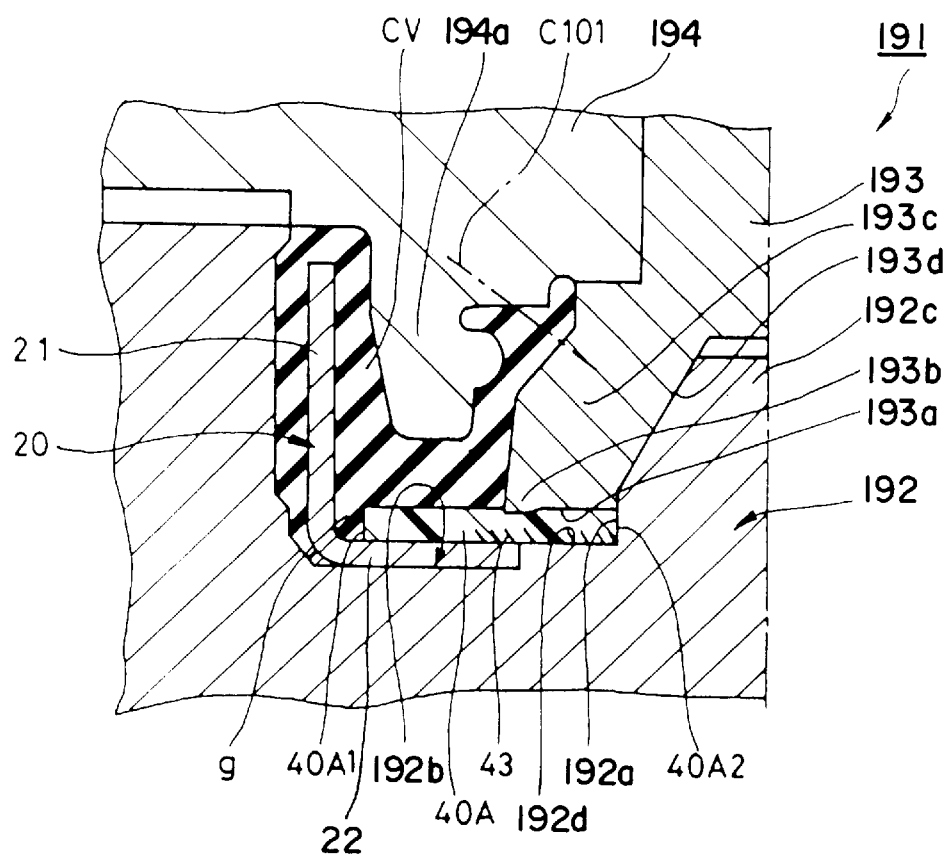
FIG. 8 is a partial longitudinal sectional view of a forming mold used for manufacturing the apparatus shown in FIG. 7.

FIGS. 7 and 8 illustrate a variant of the sealing apparatus of the aforementioned first embodiment and a manufacturing method thereof.

In this variant, as shown in FIG. 7, an annular gap g is formed between the outside-diameter and of the interposed portion 41 of the second sealing member 40 made of a resin and the inner periphery of the cylindrical portion 21 of the metal ring 20, that the resin plate 40A is positioned within the forming mold 91 with reference to the inside-diameter end of the resin plate 40A.

The sealing apparatus 1 itself has the same configuration as that of the first embodiment except that the gap g is formed between the outside-diameter end of the interposed portion 41 and the inner periphery of the cylindrical portion 21 of the metal ring 20. The same components are therefore assigned the same reference numerals, and the description thereof is omitted. The gap g between the outside-diameter end of the interposed portion 41 and the inner periphery of the cylindrical portion 21 of the metal ring 20 is filled with a rubber-like elastic material 45.

In the manufacturing method as shown in FIG. 6, when setting the resin plate 40A in the lower die 92, positioning is accomplished by engaging the peripheral surface of the outside-diameter end of the resin plate 40A with the inner periphery of the cylindrical portion 21 of the metal ring 20. The inside diameter and the thickness of the resin plate 40A are imported parameters for determining the support position for preventing tension upon sliding of the second sealing lip 42 with the rotation shaft 70 and deformation of the first sealing lip 33, and are therefore controlled with strict size tolerances.

For positioning the inside-diameter end of the resin plate 40A from the outside-diameter end of the resin plate 40A, it is necessary to carry out fabrication of the outside-diameter end surface of the resin plate 40A also under strict size control. It is also necessary to accurately position the metal ring 20 relative to the lower die 92 as an attachment reference of the resin plate 40A, and to accurately engage the inside-diameter end of the inward flange portion of the metal ring 20 with the annular step of the lower die.

Engagement of the inward flange portion 22 of the metal ring 20 and the annular step 92d serving as a guide for the metal ring 20 is a metal-to-metal one. The annular step 92d is therefore susceptible to wear, and failure to apply a proper size control may cause occurrence of eccentricity of the metal ring 20 and resultant eccentricity of the second sealing lip 42, and may cause a degree in sealing property.

In this variant, positioning relative to the forming mold is carried out with reference to the inside-diameter end of the resin plate 40A.

The variant will now be described in detail with reference to FIG. 8.

The resin plate 40A is previously formed into a flat washer shape, and the spiral second screw slot covers an area ranging from the inside-diameter end corresponding to the lip leading end to the middle portion corresponding to the bend.

The forming mold 191 of the intermediate form has a lower die 192 serving as the first mold component a first upper die 193 serving as the second mold component, and a second upper die 194 serving as the third mold component.

The lower die 192 is provided with a circular recess 192b into which the metal ring 20 and the resin plate 40A are inserted, a center projection 192c which project at the center of the bottom of this recess 192b and has a cylindrical guide portion 192a serving as a reference for guiding and positioning the inner periphery 40A2 of the resin plate 40A, and an annular step 192d protruding from the bottom surface of the recess 192b around the center projection 192c on the bottom of the recess 192b and with which the inner periphery of the inward flange portion of the metal ring 20 is engaged. The guide portion 192a is provided on the outer periphery of the lower end of the center projection 192c and forms a frustoconical shape in which the portion of the center projection 192c on top of the guide portion 192a gradually converges upward to facilitate insertion of the resin plate 40A.

The annular step 192d has a height agreeing with the thickness of the inward flange portion 22 so that, upon engagement with the metal ring 20, the inward flange portion 22 and the annular step 192d are flush with each other. The resin plate 40A is placed on the flat surface formed by the inward flange portion 22 of the metal ring 20 and the annular step 192d, and the resin plate 40A is radially positioned through engagement of the inner periphery thereof with the outer periphery of the guide portion 192a of the center projection 192c.

In the state in which the metal ring 20 and the resin plate 40A are positioned in the lower die 192, on the other hand, an annular gap 45 is formed between the outside-diameter end 40A1 of the resin plate 40A and the inner peripheral surface of the cylindrical portion 21 of the metal ring 20 so as not to impair positioning of the resin plate 40 A relative to the guide position 192a.

After setting the metal ring 20 and the resin plate 40A as described above, a rubber material is arranged on the resin plate 40A, the first upper die 193 is inserted into the recess 192b of the lower die 192, and a first mold closing is performed.

The first upper die 193 has an inserted portion 193c inserted into the recess 192b of the lower die 92. An annular pressing surface 93a pressing the resin plate 40A on the inward flange portion 22 of the metal ring 20 placed on the bottom of the recess 192b is provided at the lower end of this inserted portion 193c. A first sealing lip 33 open-air side surface forming portion for forming the open-air side surface of the first sealing lip 33 of the first sealing member 30 is provided on the outer peripheral surface of the inserted portion 193c. More specifically, a tapered engagement hole 193d engaging with the center projection 192c of the lower die 192 is provided on the lower end surface of the first upper die 193. The aforementioned pressing surface 193a is provided so as to surround this engagement hole 193d.

The annular pressing surface 193a of the inserted portion 193c holds the resin plate 40A between the inside-diameter side half thereof and the annular step 192d of the lower die 192 for pressing, and holds the resin plate 40A between the outside-diameter side half thereof and the inside-diameter end of the inward flange portion 22 of the metal ring 20 on the bottom of the recess 192c for pressing. Pouring of the rubber material is carried out on the boundary between the outside-diameter side half and the inside-diameter side half of the resin plate 40A located at the outside-diameter end of the pressing surface 193a. Further, an annular projection 193b for certainly fixing the resin plate 40A is provided at the outside-diameter end of the pressing surface 193a. The annular projection 193b is provided with a width permitting crossing over the outside-diameter end of the aforementioned annular step 192b.

The outer periphery of the inserted portion 193c is formed into a shape corresponding to the portion ranging from the lip leading end 33a of the first sealing lip 33 of the first sealing member 30 through the foot portion 33b to the inner peripheral surface of the radial portion 32. In the area of the inserted portion 193c of the first upper die 193 corresponding to the lip leading end 33a of the first sealing lip 33, a screw projection corresponding to the aforementioned first screw slot should preferably be provided.

As shown in FIG. 6B when providing an annular recess 10 at a position in the radial portion 32 of the first sealing member 30 corresponding to the bend 44 of the second sealing lip 42, it suffices to provide an annular projection 93d corresponding to the recess 10.

In this state, the second upper die 194 is closed at a prescribed speed, and the entire forming mold 191 is heated to fluidize the rubber material. The rubber material is pressed under the mold closing pressure to fill the entire cavity CV with the rubber material, thereby integrally forming the first sealing member 30 together with the metal ring 20 and the resin plate 40A. The second upper die 194 has an annular convex portion 194a for forming the side surfaces of the radial portion of the first sealing member 30 and the sealing liquid side of the first sealing lip 33 by being inserted into the recess 192b of the lower die 191.

The sealing liquid side surface of the interposed portion 41 of the second sealing member 40 and the open-air side surface of the radial portion 32 of the first sealing member 30 are bonded together during mold forming without particularly coating an adhesive. An adhesive may however be coated onto the bonded area of the resin plate 40A.

When bonding the open-air surface of the resin plate 40A and the sealing liquid side 0 surface of the inward flange portion 22 of the metal ring 20, on the other hand, it suffices to coat an adhesive onto the bonded area of the metal ring 20 or the resin plate 40A. When the open-air side surface of the resin plate 40A and the sealing liquid side 0 surface of the inward flange portion 22 of the metal ring 20 are not bonded together, an adhesive is not coated onto the sealing liquid side surface of the inward flange portion 22 of the metal ring or onto the open-air side surface of the interposed portion 41 of the resin plate 40A.

Upon completion of forming, the formed product is taken out by opening the forming mold 191. Then, the first sealing lip 33 of the first sealing member 30 is fabricated (for example, by cutting one or two cut lines in the drawing), and as required the second sealing lip 42 of the resin plate 40A is bent by deflecting the inside edge which expanding the diameter by inserting a lip forming jig (although not shown, a rod-shaped jig having a tapered surface).

By positioning relative to the forming mold 191 with reference to the inside-diameter end of the resin plate 40A, it is not necessary to apply a high-accuracy fabrication of the outside-diameter end 41c of the resin plate 40A, and it suffices to conduct fabrication only for the inside-diameter size and the thickness, which are important parameters, thus permitting reduction of the number of steps.

Because the metal ring 20 is not used as a reference for positioning the resin plate 40A, it is possible to use a lower positioning accuracy for the metal ring 20 itself, allow wear caused by metal-to-metal engagement between the metal ring 20 and the annular step 192d of the lower die 192 within a certain range, and sometimes to omit a portion of maintenance and quality control steps of the forming mold.

It is thus possible to facilitate fabrication of the second sealing member 40, achieve a highly accurate assembly of the second sealing member 40 in the forming process, and improve the steps. There is therefore available a sealing apparatus capable of displaying a satisfactory sealing property.

Second Embodiment

Figure 9A:
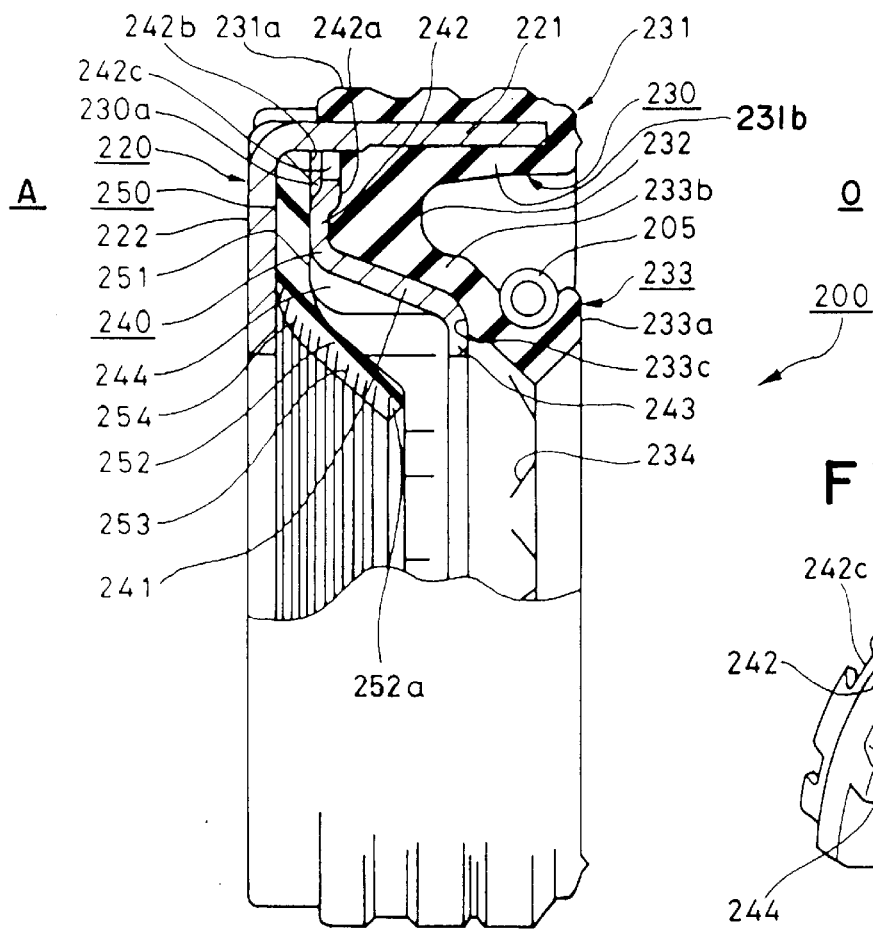
FIG. 9A is a partially cutaway side view of the sealing apparatus of the second embodiment of the invention.
Figure 9B:
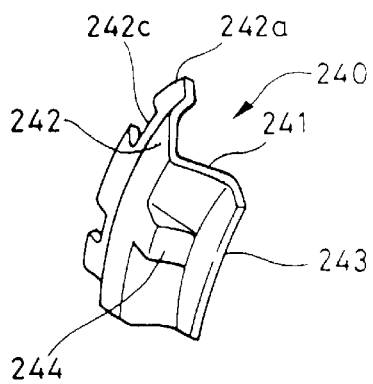
FIG. 9 B is a partial view of an auxiliary metal ring shown in FIG. 9B.
Figure 10:
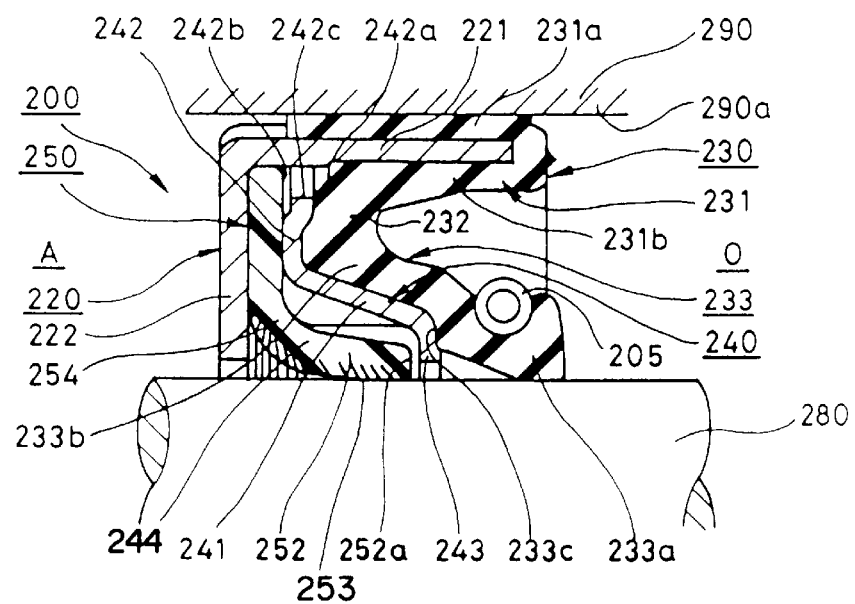
FIG. 10 is a partial sectional view of the apparatus shown in FIG. 9 in attached state.

FIGS. 9 and 10 illustrate a sealing apparatus of a second embodiment of the present invention.

In the following description of the second embodiment of the invention, the same components as in the aforementioned first embodiment will be assigned the same reference numerals. In a sealing apparatus 200, an annular gap between a rotation shaft 280 serving as a rotary member and a housing 290 serving as a stationary member having a cylindrical attachment hole receiving the rotation shaft 280 inserted therein is sealed to prevent a liquid such as an oil on the sealing liquid side 0 from leaking to an open-air side A.

The sealing apparatus 200 is substantially composed of a metal ring 220, a first sealing member 230 formed integrally with the metal ring 220, an auxiliary metal ring 240 supporting the first sealing member 230, and a second sealing member 250 held between the metal ring 220 and the auxiliary metal ring 240.

The metal ring 220 has a cylindrical portion 221 which is a member having substantially an L-shaped cross-section and concentrically arranged, upon assembly, with the rotation shaft 280 and the housing 290, and a inward flange portion 222 which extends from an end of the cylindrical portion 221 (an open-air side end upon assembly) radially inward (toward the shaft 280).

The first sealing member 230 is an annular member made of a rubber-like elastic material formed substantially into a U-shape which opens toward the sealing liquid side, and has a radial portion 232 corresponding to the base of the U-shape, an outer cylinder 231 which extends from the outside-diameter end of the radial portion 232 axially to the sealing liquid side 0, and a first sealing lip 233 which extends from the inside-diameter end of the radial portion 232 axially to the sealing liquid side 0 and has a lip leading end 233a slidably in sealing contact with the surface of the rotation shaft 280.

The cylindrical portion 221 of the metal ring 220 is buries in the outer cylinder 231 made of a rubber-like elastic material. The outer periphery and the inner periphery of the cylindrical portion 221 are covered with an outer periphery rubber portion 231a and an inner periphery rubber portion 231b of the outer cylinder 231. When assembling the first sealing member 230 to a shaft hole 290a of the housing 290, the outer periphery rubber portion 231a comes into sealing contact with the inner periphery of the housing 290.

The radial portion 232 has substantially the same radial size as that of the inward flange portion 222, and the inside-diameter end thereof is located at the same position as the inside-diameter end of the inward flange portion 222.

The sealing liquid side surface of the first sealing lip 233 is connected to the sealing liquid side surface of the radial portion 232 via an arcuate corner, and the open-air side surface of the first sealing lip forms a continuous surface with the inner peripheral surface of the radial portion 232. The angle portion with the open-air side surface of the inner peripheral surface of the radial portion 232 is formed into an arcuate shape. The radial portion 232 has an axial thickness substantially equal to the length of the first sealing lip 233.

A first screw slot 234 serving as the first screw pump acting portion having a pump function of transporting the liquid to the sealing liquid side 0 through rotation sliding with the rotation shaft 280 is provided on the sliding surface of the lip leading end 233a of the first sealing lip 233.

The inner periphery of the lip leading end 233a is formed into a shape having a triangular cross-section projecting radially inward, and the apex is in contact with the entire periphery of the rotation shaft 280 surface to seal the same. A screw slot 234 is provided on the open-air side slant beyond the apex. When providing The first screw slot 234 in a ∧-shape as shown in FIG. 9A, this configuration permits display of the pump function to cause the liquid to flow to the sealing liquid side 0 irrespective of in which direction relative to the shaft 280 the sealing apparatus rotates.

It is needless to mention that the screw pump acting portion is not limited to the first screw slot 234, but may be in the form of a screw projection.

A spring ring 205 is appropriately attached to the outer periphery of the first sealing lip 233 to impart tension in the diameter reducing direction.

The auxiliary metal ring 240 is arranged along the open-air side A surface of the first sealing member 230, and has a tapered cylinder 241 composing a support extending along the first sealing lip 233; a fixed flange portion 242 which is provided at the larger-diameter end of the tapered cylinder 241, bonded and fixed along the open-air side surface of the radial portion 232 of the first sealing member 230, and engaged with, and fixed to, the cylindrical portion 221 of the metal ring 220; and an inward flange portion 243 which is provided at the smaller-diameter end of the tapered cylinder 241, and is bent along a jaw portion 233a of the first sealing lip 233.

Even when the sealing liquid 0 is under a high pressure, therefore, it is possible to prevent the first sealing lip 233 from being turned over.

It is possible to more certainly prevent the first sealing lip 233 from being turned over by arranging the tapered cylinder 241 so as to support a foot portion 233b of the first sealing lip 233, and arranging the inward flange portion 243 so as to project radially inward (on the rotation shaft 280 side) from the inside-diameter end of the jaw portion 233c of the lip leading end 233a.

A plurality of independent projections 244 are provided in the circumferential direction on the inner peripheral surface of the tapered cylinder 241 to improve strength of the auxiliary metal ring 240 itself, to reduce the weight by reducing thickness of the auxiliary metal ring 240, and to reduce the cost as shown in FIG. 9B.

There projections 244, each of which has substantially a right-triangular cross-section, have bottom surfaces provided along a cylindrical surface passing through the smaller-diameter end of the tapered cylinder 241. Side surfaces thereof on the open air side are located on the extension of the open-air side surface of the fixed flange portion 242. The angle portion between the base and the side is in contact with the inner periphery of the bend 254 of the second sealing member 250, and is formed into an arcuate shape following the radius of curvature of the bend 254.

An annular step 242a bent axially on the sealing liquid side 0 is provided at the outside-diameter end of the fixed flange portion 242. An annular gap 242b is formed between the outside-diameter end and the interposed portion 251 of the second sealing member 250. A plurality of notches 242c serving as communicating portions are formed in the circumferential direction at the outside-diameter end, and are filled with a rubber-like elastic material. Rubber portions 230a thus formed are in close contact with the interposed portion 251 of the second sealing member 250.

On the other hand, the second sealing member 250 is made of a resin material such as PTFE, and has a flange-shaped interposed portion 251 held between the inward flange portion 222 of the metal ring 220 and the fixed flange portion 242 of the auxiliary metal ring 240, and a second sealing lip 252, made of a resin, which extends from the inside-diameter end of the interposed portion 251 via the bend to the axial sealing liquid side 0, is located in a gap between the support 241 of the auxiliary metal ring 240 and the rotation shaft 280, and has the inner periphery thereof slidably in sealing contact with the surface of the rotation shaft 280. The bend 254 of the flange-shaped interposed portion 251 and the second sealing lip 252 is in contact with the angle portion of the projection 244 of the auxiliary metal ring 240. The middle portion extends along the inner peripheral surface of the projection, and the lip leading end 252a extends to the proximity to the inward flange portion 243 serving as the leading end bend of the auxiliary metal ring 240.

The second sealing member 250 folds the inside-diameter end of the flat washer-shaped resin plate axially toward the sealing liquid side 0 into a cone-shape while elongating the same in the circumferential direction to form a second sealing lip 252. The diameter is expanded along the surface of the rotation shaft 280 upon insertion of the rotation shaft 280, and a contact surface pressure is obtained by the elastic restoring force thereof.

A second screw slot 253 composed of a slit groove spirally formed at a prescribed pitch from the lip leading end in the screw axial direction, serving as a second screw pump acting portion, provided with a pump function of transporting the liquid between the sliding surfaces to the sealing liquid side 0 by rotation sliding with the rotation shaft 280 is provided also on the sliding surface of the second sealing lip 252.

In the case of the spiral second screw slot 253, the sealing apparatus 100 usually rotates only in a single direction relative to the shaft 280. It therefore displays the pump effect most efficiently for the rotation in a single direction when applied to a place where the sealing apparatus does not rotate so often in any other direction.

When applying the sealing apparatus to a place where rotation is in the both directions, the second screw pump acting portion should preferably comprise a plurality of annular slit groove provided at a prescribed pitch in the axial direction.

The second screw slot 253 covers portions ranging from the lip leading end 253a to the middle portion and the bend 254. By providing the second screw slot 253 on the bend 254, it is possible to improve flexibility, inhibit an increase in tension of the second sealing lip 252 relative to the rotation shaft 280 upon occurrence of axial eccentricity and prevent wear of the second sealing lip 252 by improving eccentricity follow-up property.

The second screw slot 253 should preferably have a depth of the up to 75& of the thickness of the second sealing lip 252: an excellent pump effect is available when setting a pitch of 0.3 (mm), and inclination angle within a range of from 35 (25?) to 75°, and a depth of 0.5 mm for the second screw slot 253 with a thickness of the second sealing lip 252 of 1.0 (mm).

Further, by setting the bending position of the bend where bending is effected from the interposed portion 251 toward the second sealing lip 252 on the outside-diameter side from the inside-diameter end of the inward flange portion 222 of the metal ring 220, as shown in the drawing, i.e., by adopting a configuration in which the position where the second sealing member 240 is held by the first sealing member 230 is limited on the outside-diameter side from the interposing position by the inward flange portion 222 of the metal ring 220, eccentricity follow-up property of the second sealing lip 242 can be improved.

When the first sealing member 230 is mold-formed (vulcanization forming in a rubber mold) in the manufacturing process of the sealing apparatus 100, the second sealing member 250 is engaged with the metal ring 220 so as to be in contact with the inward flange portion 222. It is then placed in the mold in a state in which the auxiliary metal ring 240 is attached, and then mold is closed. The second sealing member 250 made of a resin is pressed against the inward flange portion 222 under a pressurizing pressure of a rubber-like elastic material.

Notches (in an arbitrary number) 242c serving as communicating portions are provided in the fixed flange portion 242 located at the outside-diameter end of the auxiliary metal ring 240. The rubber-like elastic material therefore flows to the second sealing member 250 side through the notches upon vulcanization forming of the first sealing member 230, and can thus bond it to the second sealing member 250 side and the auxiliary metal ring 240.

In this case, bonding property can further be improved by providing gaps at the outside-diameter end of the second sealing member 250 as shown in FIG. 7, and pouring the rubber-like elastic material also in these gaps.

The interposed portion 251 of the second sealing member 250 is pressure-bonded and fixed between the fixed flange portion 242 of the auxiliary metal ring 240 and the inward flange portion 222 of the metal ring 220, or adhered and fixed by using an adhesive to prevent rotation.

According to the sealing apparatus having the configuration as described above, the sealing liquid on the sealing liquid side 0 is sealed, on the housing 290 side, by the outer cylindrical portion 231 of the first sealing member 230 reinforced by the cylindrical portion 221 of the metal ring 220, and on the shaft 280 side, by the first sealing lip 233 of the first sealing member 230.

The liquid leaking from the first sealing lip 233 is brought back to the sealing liquid side O by the first screw slot 234 provided on the first sealing lip 233.

When the liquid is not returned but leaks in spite of the pressure of the first screw slot 234, the liquid is appropriately brought back to the sealing liquid side O by a second screw slot 253 provide on the second sealing member 250.

It is thus possible to display a very excellent sealing property with a simple configuration.

Since the foot portion of the first sealing lip 233 of the first sealing member 230 is supported by the support 241 of the auxiliary metal ring 240, it is possible to prevent the first sealing lip 233 from being turned over, and thus to maintain a stable sealing performance even under a high pressure.

Third Embodiment

A third embodiment of the present invention will now be described.

The third embodiment id characterized in that an interposed portion 341 of a second sealing member 340 is bonded an fixed to a radial portion 332 of a first sealing member 330, the outside-diameter side being bonded and fixed to the inward flange portion 322 of a metal ring 320, and the bend 344 on the inside-diameter side is not bonded and separable therefrom.

Figure 11:
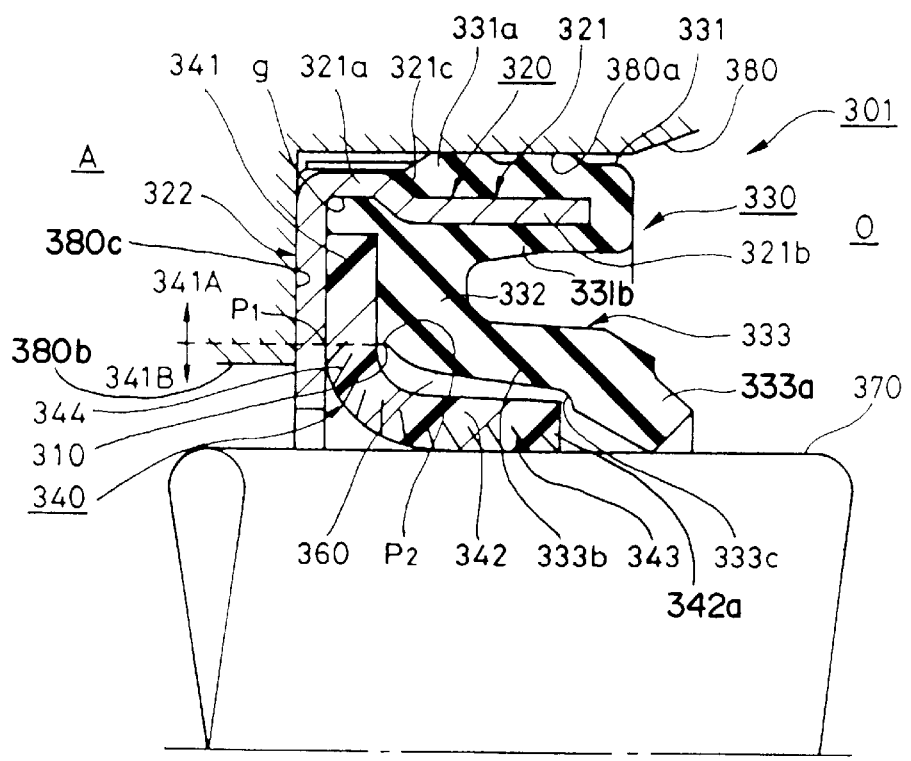
FIG. 11 is a partial sectional view of a sealing apparatus of a third embodiment of the invention in attached state.
Figure 12:
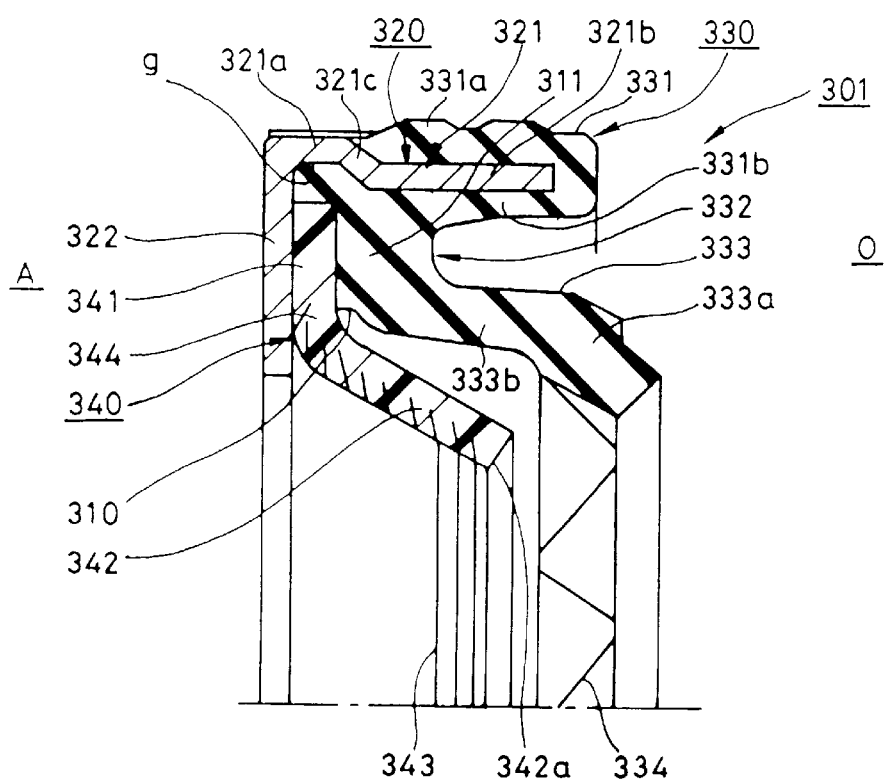
FIG. 12 is a partial sectional view of the apparatus shown in FIG. 11 in free state.
Figure 13:
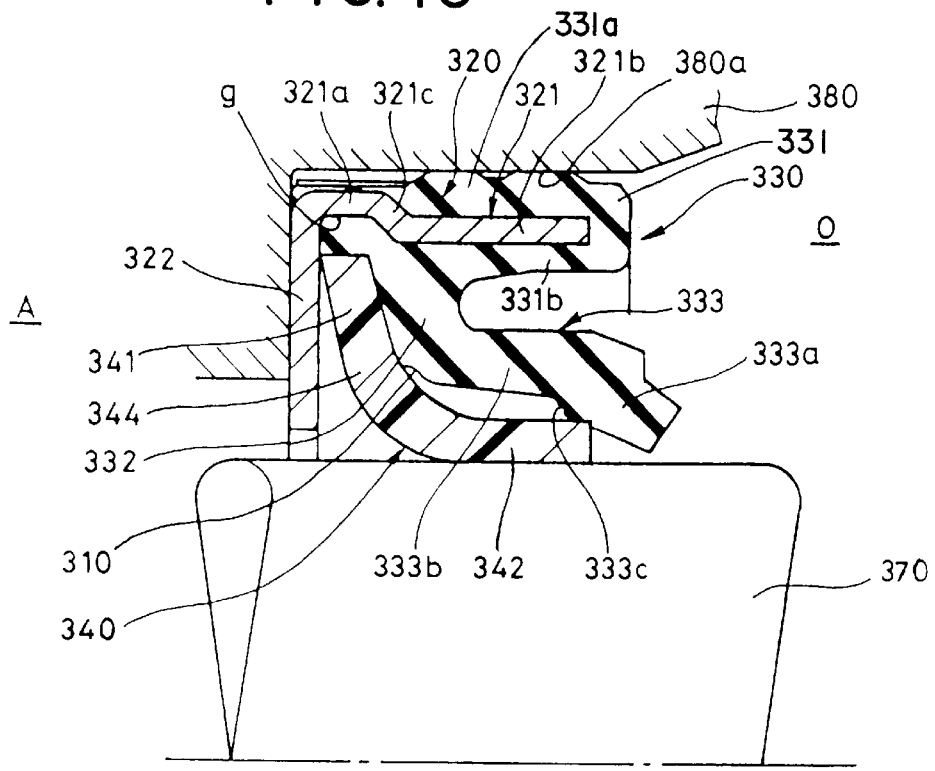
FIG. 13 is a partial longitudinal sectional view illustrating in an exaggerated form the state of shaft insertion of the apparatus shown in FIG. 11 in which the back of the second sealing ring is not bonded.

FIGS. 11 and 12 illustrate a sealing apparatus of the third embodiment of the invention.

The third embodiment of the invention will be described in detail: the sealing apparatus 301 prevents a liquid on a sealing liquid side O such as an oil from leaking onto an open-air side A by sealing an annular gap between a rotation shaft 370 serving as a rotary member and a housing 380 serving as a stationary member provided with a cylindrical attachment hole 380a receiving insertion of the rotation shaft 370.

The sealing apparatus substantially comprises a metal ring 320, a first sealing member 330 formed integral with the metal ring 320, and a second sealing member 340 held between the metal ring 320 and the first sealing member 330.

The attachment hole 380a of the housing 380 has a configuration in which an opening on the sealing liquid side O of a small-diameter shaft hole 380b of the housing 380 is notched in a large diameter into a stepped shape, and an end face 380c hit by the sealing apparatus 301 is provided at the deepest end of the attachment hole 380a.

The metal ring 320 is an annular member having substantially an L-shaped cross-section, and has a cylindrical portion 321 which is arranged concentrically with the rotation shaft 370 and the housing 380 upon assembly, and an inward flange portion 322 which extends from an end of the cylindrical portion 321 (open-air side end upon assembly) radially inward (direction toward the rotation shaft 370).

The cylindrical portion 321 has a stepped cylindrical shape having an open-air side large-diameter portion 321a and a sealing liquid side O small-diameter portion 321b having a diameter smaller than the large-diameter portion 321a. The large-diameter portion 321a and the small-diameter portion 321b are formed concentrically, and are continuous via a step 321c.

The first sealing member 330 is an annular member made of a rubber-like elastic material formed into substantially a U-shaped opening on the sealing liquid side O, and has a radial portion 332 corresponding to the base of the U-shape, and an outer cylindrical portion 331 which extends from the outside-diameter end of the radial portion 332 to the axial-direction sealing liquid side O, and a first sealing lip 333 which extends from the inside-diameter end of the radial portion 332 to the axial-direction sealing liquid side O and has a lip leading end 333a slidably in sealing contact with the surface of the rotation shaft 370.

The cylindrical portion 321 of the aforementioned metal ring 320 is buried in the outer cylindrical portion 331 made of the rubber-like elastic material. Outer and inner peripheries of the cylindrical portion 321 are covered with an outer periphery rubber portion 331a and an inner periphery rubber portion 331b of the outer cylindrical portion 331. The outer periphery rubber portion 331a covers only the small-diameter portion 321b from the step 321c of the cylindrical portion 321, and the metal surface of the outer periphery of the large-diameter portion 321a located at the open-air side end is exposed. The outer periphery rubber portion 331a has a larger outside diameter than that of the large-diameter portion 321a. The outer periphery rubber portion 331a is in direct sealing contact with the inner periphery of the attachment hole of the housing so as to form a slight gap between the outer periphery of the larger-diameter portion 321a of the metal surface and the inner periphery of the attachment hole. On the other hand, the radial portion 332 has a radial size shorter than the inward flange portion 322, and the inside-diameter end thereof is located at a position radially outside by a prescribed size from the inside-diameter end of the inward-diameter end.

The sealing liquid side surface of the first sealing lip 333 is connected to the sealing liquid side surface of the radial portion 332 via an arcuate cover portion. The open-air side surface of the first sealing lip 333 forms a continuous surface with the inner peripheral surface of the radial portion 332.

On the other hand, an annular recess 310 formed by making hollow so as to partially provide a step from the inner peripheral surface of the radial portion 332 is provided at the angle between the inner peripheral surface of the radial portion 332 and the open-air side surface. The angle portion between the bottom surface of this recess 310 and the inner peripheral surface of the radial portion 332 is formed into an arcuate shape.

A first screw clot 334 serving as the pump acting portion having a pump function of transporting the liquid to the sealing liquid side O through rotation sliding with the rotation shaft 370 is provided also on the sliding surface of the lip leading end 333a of the first sealing lip 333, as in the first and the second embodiments. The inner periphery of the lip leading end 333a is formed into a shape having a triangular cross-section projecting radially inward, and the apex is in contact with the entire periphery of the rotation shaft surface to seal the same. A first screw slot 334 is provided on the open-air side slant beyond the apex of the lip leading end 333a.

The configuration of the first screw slot 334, being quite the same as the first screw slot of the first embodiment, will not be described here. It is needless to mention that the screw pump acting portion is not limited to the first screw slot 334, but may be in the form of a crew projection. A spring ring may be attached to the outer periphery of the lip leading end 333a of the first sealing lip 333.

On the other hand, the second sealing member 340 is made of a resin material such as PTFE, and has a flange-shaped interposed portion 341 held between the inward flange portion 322 of the metal ring 320 and the radial portion 332 of the first sealing member 330, and a second sealing lip 342, made of a resin, which extends from the inside-diameter end of the interposed portion 341, via the bend 344, axially to the sealing liquid side 0, is located in a gap between the open-air side surface of the first sealing lip 333 and the rotation shaft 370, and has the inner periphery thereof slidably in sealing contact with the surface of the rotation shaft 370. The lip leading end 342a of the second sealing lip 342 extends to a position of a jaw portion 333c of the lip leading end 333a of the first sealing lip 333. The second sealing lip 342 is, in the free state, in the form of a cone which converges gradually to a smaller diameter axially toward the sealing liquid side. Upon insertion of the rotation shaft 370, the conical portion having a smaller diameter than the outer periphery of the rotation shaft 370 is expanded into a cylindrical shape along the surface of the rotation shaft 370, and a contact surface pressure is obtained by the elastic restoring force thereof.

Upon insertion of the rotation shaft 370, the sealing liquid side surface corresponding to the outer peripheral surface of the second sealing lip 342 and the open-air side surface corresponding to the inner peripheral surface of the first sealing lip 333 are separated from each other via an annular gap 360 so that the first sealing lip 333 does not interfere with the second sealing lip 342. Under an ordinary pressure of the sealing liquid, therefore, the first sealing lip 330 freely deforms within a range equal to the gap, thus displaying an excellent follow-up property to eccentricity of the rotation shaft 370.

It is needless to mention that, according as the pressure of the sealing liquid becomes higher, the foot portion 333b of the first sealing lip 333 defects inward in the radial direction. When a prescribed pressure is exceeded, the gap 360 is eliminated, so that the open-air side surface of the foot portion 333b of the first sealing lip 333 comes into contact with the open-air side surface of the second sealing lip 342. The foot portion 333b of the first sealing lip 333 is supported by the second sealing lip 342 in sliding contact with the rotation shaft 370, thus inhibiting an excessive deformation of the first sealing lip to maintain sealing property.

When regulating deformation of the first sealing lip 333, a range of this second sealing lip 342 from the bend 344 located at foot with the interposed portion 341 for a prescribed length supports the inner peripheral surface of the radial portion 332 of the first sealing member 330. Further, the leading end thereof supports a foot portion 333b of the first sealing lip 333 of the first sealing member 330.

A recess 310 provided at the angle portion with the open-air side surface of the inner periphery of the radial portion 332 of the first sealing member 330 is opposite to the bend 344 from the interposed portion 341 of the second sealing member 340 to the second sealing lip 342. Even when the first sealing lip 333 and the inner periphery of the radial portion 332 are deformed by the pressure of the sealing liquid, and come into contact with the second sealing lip 342, therefore, a gap 360 is formed between the bend 344 and the radial portion 332. By the utilization of this gap 360, the second sealing lip 342 is largely bent from the foot of the bend 344, thus improving follow-up property relative to eccentricity or axial displacement of the rotation shaft 370 as well as to swinging thereof.

The flange-shaped interposed portion 341 of the second sealing member 340 is opposite to the inner peripheral surface of the large-diameter portion 321a located on the open-air side of the cylindrical portion 321 of the metal ring 320 with a prescribed annular gap g in between. This annular gap g is filled with a rubber-like elastic material of the first sealing member 330. The axial length of the large-diameter portion 321a of the metal ring 320 is substantially equal to the thickness of the interposed portion 341 of the second sealing member 340.

The interposed portion 341 of the second sealing member 340 is bonded and fixed to the radial portion 332 of the first sealing member 330. The entire outside-diameter side is bonded and fixed to the inward flange portion 322 of the metal ring 320, and the bend 344 on the inside-diameter side is not bonded and separable.

When the sealing liquid side 0 surface of the inward flange portion 322 of the metal ring 320 is not bonded to the open-air side A surface of the interposed portion 341 of the second sealing member 340, the second sealing lip is brought over axially to the sealing liquid side 0 by contact frictions with the rotation shaft 370 upon insertion of the rotation shaft 370, and the interposed portion 341 is deformed around the outside-diameter end so that the inside-diameter end projects axially to the sealing liquid side. As a result of this deformation of the interposed portion 341, the inside-diameter end of the radial portion 332 of the first sealing member 330 made of a rubber-like elastic material deforms axially toward the sealing liquid side 0. Further, the lip leading end 342a of the second sealing lip 342 enters the gap between the lip leading end 333a of the first sealing lip 333 and the rotation shaft 370: the lip leading end 333a of the first sealing lip 333 floats up, producing a gap from the rotation shaft 370, and sealing property may become lower.

In this embodiment, therefore, the interposed portion 341 of the second sealing member 340 is bonded and fixed also to the inward flange portion 322 of the metal ring 320.

A boundary PI between a bonded area 341A and a non-bonded area 341B of the second sealing member 340 to the inward flange portion 322 of the metal ring 320 is aligned with the inside-diameter end position P2 of the bonded area between the radial portion 332 of the first sealing member 330 and the interposed portion 341. This bonded area corresponds to an area where the vulcanization forming pressure of the first sealing member 330 is applied, via a resin plate composing the second sealing member 340, to the inward flange portion 322 of the metal ring 320 during mold forming, as described later.

A second screw slot 343 serving as the second screw pump acting portion having a pump function of transporting the liquid to the sealing liquid side 0 through rotation sliding with the rotation shaft 370 is provided on the sliding surface of the second sealing lip 342. The second screw slot 343 may be quite the same spiral slit groove as the second screw slot 343 in the first embodiment, or may be a plurality of annular grooves.

According to the sealing apparatus having the configuration as described above, the sealing liquid on the sealing liquid side 0 is sealed, on the housing 380 side, by the outer cylindrical portion 331 of the first sealing member 330 reinforced by the cylindrical portion 321 of the metal ring 320, and on the shaft 370 side, by the first sealing lip 333 of the first sealing member 330.

Since the foot portion 333b of the first sealing lip 333 of the first sealing member 330 is supported by the leading end of the second sealing lip 342, it is possible to prevent the first sealing lip 333 from being turned over, and thus to maintain a stable sealing performance.

Because the interposed portion 341 of the second sealing member 340 is bonded and fixed to the inward flange portion 322 of the metal ring 320, it is possible to prevent rotation of the second sealing member 340. Frictions upon insertion of the rotation shaft 370 never causes separation of the interposed portion 341 of the second sealing member from the open-air side surface of the inward flange portion 322 of the metal ring 320, and floatation of the first sealing lip 333b is not caused.

Further, only the outside-diameter side of the interposed portion 341 is bonded and fixed to the inward flange portion 322, and the bend 344 on the inside-diameter side is not bonded. It is therefore possible, even upon occurrence of eccentricity of the rotation shaft 370, to improve eccentricity follow-up property of the second sealing member 340 by deforming not only the second sealing lip 342 of the second sealing member 340, but also the inside-diameter side of the interposed portion 341, thus permitting improvement of the sealing property of the sealing apparatus 301.

The manufacturing method of the sealing apparatus of the above-mentioned embodiment will now be described with reference to FIGS. 14 and 15.

The sealing apparatus is manufactured by a method comprising the steps of previously fabricating the flat washer-shaped resin plate 340A and the metal ring 320 to serve as the second sealing member 340, applying a process known as insert-forming by inserting the metal ring 320 and the resin plate 340A into a forming mold 391 and forming them integrally with the first sealing member 330 to form an intermediate form 301A, and then, bending the stripped resin plate 340A of the intermediate form 301A to form the second sealing lip 342. The intermediate form 301A means the state prior to bending of the second sealing lip 342 of the second sealing member 340, in which the inside-diameter side half of the flat washer-shaped resin plate 340A forming the second sealing member 340 extends radially.

Figure 14:
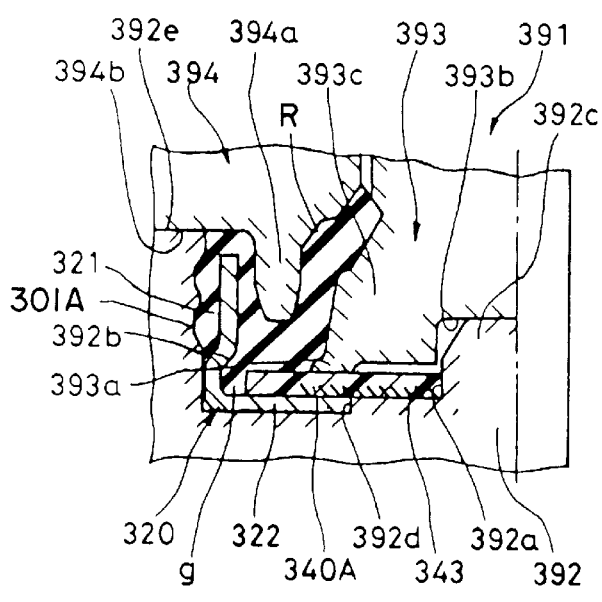
FIG. 14 is a partial longitudinal sectional view of a forming mold used for manufacturing the apparatus shown in FIG. 11.

The forming mold 391 for the intermediate form has a lower die 392 serving as a first mold component, a first upper die 393 serving as a second mold component, and a second upper die 394 serving as a third mold component as shown in FIG. 14.

The lower die 392 is provided with a circular recess 392b into which the metal ring 320 and the flat washer-shaped resin plate 340A are inserted; a center projection 392c projecting at the bottom center of the recess 392b and having a cylindrical guide 392a which guides the inner periphery of the resin plate 340A and thus serves as a positioning reference for carrying out radial positioning thereof, and an annular step 392d protruding from the bottom surface of the recess around the guide 392a on the bottom of the recess and with which the inner periphery of the inward flange portion 322 of the metal ring 320. The guide 392a is provided on the outer periphery of the lower end of the center projection 392c. The portion on top of the guide 392a of the center projection 392c takes a frustoconial shape converging gradually upward into a smaller diameter to ensure easy insertion of the resin plate 340A.

The annular step 392d has a height agreeing with the thickness of the inward flange portion 322 so that, upon engagement with the metal ring 320, the inward flange portion 322 and the annular step 392d are flesh with each other. The resin plate 340A is placed on substantially the flat surface formed by the inward flange portion 322 of the metal ring 320 and the annular step 392d, and the resin plate 340A is radially positioned through engagement of the inner periphery thereof with the outer periphery of the guide 392a of the center projection 392c.

In the state in which the metal ring 320 and the resin plate 340A are portioned in the lower die 392, on the other hand, an annular gap g is formed between the outside-diameter end of the resin plate 340A and the inner peripheral surface of the cylindrical portion 321 of the metal ring 320 so as not to impair positioning of the resin plate 340A relative to the guide 392a.

When setting the resin plate 340A in the lower die 392, positioning may be conducted by engaging the peripheral surface of the outside-diameter end of the resin plate 340A with the inner periphery of the cylindrical portion 321 of the metal ring 320. The inside diameter and thickness of the resin plate 340A are important properties for determining the supporting position for preventing tension and deformation of the first sealing lip 333 caused upon sliding of the second sealing lip 342 with the rotation shaft 370, and are controlled with strict size tolerances.

In order to perform positioning of the inside-diameter end of the resin plate 340A by means of the outside-diameter end of the resin plate 340A, it is necessary to fabricate the outside-diameter end surface of the resin plate 340A under a strict size control. It is also necessary to accurately position the metal ring 320 serving as an attachment reference of the resin plate 340A relative to the lower die 392, and to conduct high-accuracy engagement of the inside-diameter end of the inward flange portion 322 of the metal ring 320 with the annular step 392d of the lower die.

However, engagement of the inward flange portion 322 of the metal ring 320 and the annular step 392d is a metal-to-metal one. The annular step 392d is therefore susceptible to wear, and failure to apply a proper size control may cause occurrence of eccentricity of the metal ring 320 and resultant eccentricity of the second sealing lip 342, and may cause a decrease in sealing property.

In this respect, by positioning relative to the lower die 392 with reference to the inside-diameter end of the resin plate 340A, it is not necessary to apply a high-accuracy fabrication of the outside-diameter end of the resin plate 340A, and it suffices to conduct fabrication only for the inside diameter and the thickness, which are important parameters, thus permitting reduction of the number of steps.

Because the metal ring 320 is not used as a reference for positioning the resin plate 340A, it is possible to use a lower positioning accuracy for the metal ring 320 itself, allow wear caused by metal-to-metal engagement between the metal ring 320 and the annular step 392d of the lower die 392 within a certain range, and sometimes to omit a portion of maintenance and quality control steps of the forming mold 391.

It is thus possible to facilitate fabrication of the second sealing member 340, achieve a highly accurate assembly of the second sealing member 340 in the forming process, and improve the steps. There is therefore available a sealing apparatus capable of displaying a satisfactory sealing property.

The first upper die 393 has inserted portion 393c inserted into the recess 392b of the lower die 392. An annular pressing surface 393a pressing the resin plate 340A on the inward flange portion 322 of the metal ring 320 placed on the bottom of the recess 392b is provided at the lower end of this inserted portion 393c. A first sealing lip open-air side surface forming portion for forming the open-air side surface of the first sealing lip 333 of the first sealing member 330 is provided on the outer peripheral surface of the inserted portion 393c. More specifically, a hole 393b for inserting the top end of the center projection 392c of the aforementioned lower die 392 is provided on the lower end surface of the first upper die 393. The aforesaid pressing surface 393a is provided at the lower end outside-diameter end of the inserted portion 393c so as to surround this hole 393b and so as to slightly and annularly project from the lower end surface. The inside-diameter end position of the pressing surface 393a substantially agrees with the outside-diameter position of the annular step 392d. The resin plate 340A is thus pressed by the pressing surface 393a between the same and the inward flange portion 322 of the metal ring 320.

A screw projection corresponding to the aforementioned first screw slot 334 should preferably be provided in an area of the aforesaid first sealing lip open-air side surface forming portion of the first upper die 393 corresponding to the lip leading end 33a of the first sealing lip 333.

The second upper die 394 has an annular convex portion 394a inserted into the recess 392b the lower die 392 and forming the radial portion of the first sealing member 330 and the sealing liquid side surface of the first sealing lip 333. This second upper die 394 is a ring member at the center of which the aforesaid first upper die 393 is assembled. The lower end surface 394b radially outside the annular convex portion 394a serves as a dividing plane hitting a flat surface 392e surrounding the recess 392b of the lower die 392.

The intermediate form 301A is formed by placing the metal ring 320 with the inward flange portion 322 downward into the opened lower die 392, inserting the resin plate 340A formed into a flat washer shape via an adhesive onto the inward flange portion 322, and charging a rubber-like elastic raw material.

A spiral second screw slot 343 is provided to cover an area of the resin plate 340A ranging from the inside-diameter end corresponding to the lip leading end 342a to a middle portion corresponding to the bend 344.

Then, the first upper die 393 is closed. The resin plate 340A is pressed with the pressing surface 393a thereof, and swishing is performed on the boundary between the outside-diameter side half and the inside-diameter side half of the resin plate 340A. The swishing position corresponds to the outside-diameter end of the pressing surface 393a. The inside-diameter end position of the pressing surface 393a corresponds to the outside-diameter end position of the annular step 392d. In this state, the second upper die 394 is closed at a prescribed speed, and the entire forming mold 391 is heated to fluidize the rubber raw material R. The entire cavity is filled with the raw material rubber R by pressing the same under the closing pressure. Thus, simultaneously with forming of the first sealing member 330, the outside-diameter side half of the resin plate 340A and the inward flange portion 322 of the metal ring 320 are bonded and fixed, thereby forming the intermediate form.

The radial portion 332 of the first sealing member 330 made of a rubber-like elastic material and the resin plate 340A are bonded during the mold forming stage without coating an adhesive. An adhesive may however be coated onto the bonded area of the resin plate 340A.

For the contact surface between the inward flange portion 322 of the metal ring 320 and the interposed portion 341 of the second sealing member 340, only the area subjected to the forming pressure of the raw material rubber R, i.e., only the area radially outside the pressing surface 393a of the first upper die 393, subjected to the action of the vulcanization forming pressure via the resin plate 340A is fixed by bonding. The area not subjected to the vulcanization forming pressure, radially inside the area including the pressing surface 393a is left unbonded.

Upon completion of insert-forming, the forming mold is opened to strip off the formed product, and then, the first sealing lip 333 of the first sealing member 330 is fabricated (for example, single-surface cut or double-surface cut along the cut line in the drawing), and at the same tine, the inside-diameter side half of the resin plate 340A is bent by means of a bending forming apparatus, thereby forming the second sealing lip 342.

Figure 15:
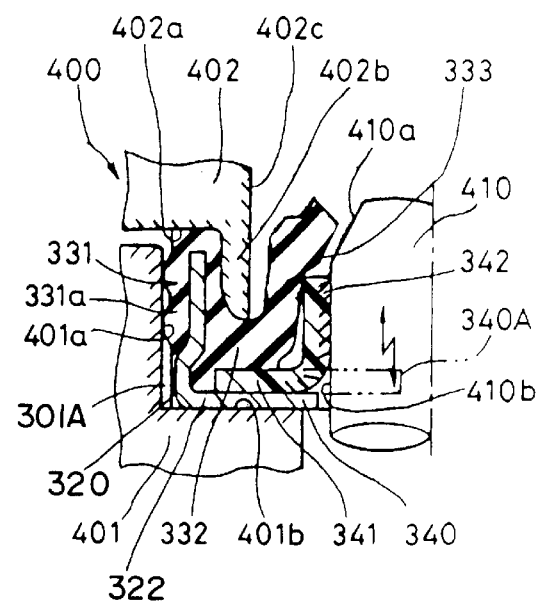
FIG. 15 is a partial sectional view of a forming apparatus illustrating a bending fabrication of the second sealing lip from a resin plate formed in the forming mold shown in FIG. 14.

The bending fabrication is carried out by means of a bending forming apparatus as shown in FIG. 15.

The intermediate form 301A before bending is fixed by means of an annular fixing jig 400 while exposing the first sealing lip 333 and the inside-diameter half of the resin plate 340A toward inside. The intermediate form is bent into a cylindrical shape while expanding the diameter of the inside-diameter side half of the resin plate 340A by inserting a rod-shaped forming jig 410 having a tapered surface into the fixing jig 400.

The fixing jig 400 is capable of pressure-bonding and separable, and has just and second fixing rings 401 and 402 for fixing the first sealing lip 333 and the inside-diameter half of that in the exposed state.

An annular step 401b is provided on the first fixing ring 401. The inward flange portion 322 of the metal ring 320 of the form is placed on this annular step 401b, and the outer periphery rubber 331a of the first sealing member 330 is engaged with the inner periphery wall 401a surrounding the annular step 401b. On the other hand, the second fixing ring 402 has a pressing surface 402a which comes into contact with the leading end of the outer cylindrical portion 331 of the first sealing member 330 and folds the intermediate form 301A between the same and the annular step 401b of the first fixing ring 401, and an annular holding projection 402b which projects from the inside-diameter end into a cylindrical shape for engagement with the inner periphery of the outer cylindrical portion 331 of the first sealing member 330 and holds down the radial portion 332. In a state in which the intermediate form 301A is fixed with the fixing jig, the first sealing lip 333 is housed in a center hole 402c of the second fixing ring 402.

On the other hand, the forming jig 410 is composed of a round rod having substantially the same diameter as the rotation shaft 370. The forming jig 410 is axially and relatively movably assembled with the fixing jig 400 and has at the leading end thereof a tapered portion 410a which is pressure-inserted into the center hole and bends it gradually in the axial direction while expanding the bore of the inside-diameter side half of the resin plate 340A.

The resin plate 340A is bent by pressure-inserting the forming jig 410 with the tapered portion 410a as the leading end axially into the center hole of the resin plate 340A, and axially bending it while gradually expanding the bore end of the resin plate 340A along the shape of the tapered portion 410a thereby forming the second sealing lip 342. At this point, a force pulling in the inserting direction of the forming jig 410 acts on the outside-diameter side half (the interposed portion 341 of the second sealing member 340) of the resin plate 340A held between the inward flange portion 322 of the metal ring 320 and the radial portion 332 of the first sealing member 330. Deformation of the outside-diameter half of the resin plate 340A is however prevented because it is bonded to the inward flange portion 322 on the outside-diameter side of the resin plate 340A, and further, held down via the radial portion 332 by the holding projection 402b of the second fixing ring 402.

After thus bending the second sealing lip 342, the forming jig 410 is removed axially in the reverse direction, and the finished product of the sealing apparatus is taken out by separating the first and the second fixing rings 401 and 402 from each other.

The third embodiment is applicable also to a sealing apparatus not provided with a first or second screw slot.

What is claimed is:

1. A sealing apparatus, which is applied to a rotary member, said sealing apparatus comprising:
    a metal ring having a cylindrical portion and an inward flange portion extending radially inward from an open-air side end of the cylindrical portion;
    a first sealing member made of an elastic rubber material, said first sealing member having a cylindrical portion in which the cylindrical portion of said metal ring is buried, and a radial portion opposite to the inward flange portion of the metal ring, and a first sealing lip axially extending from the radial portion to a sealing liquid side and having a lip leading end tightly, slidably contacting a surface of the rotary member;
    a second sealing member made of a resin material, and having a flange-shaped interposed portion held between the inward flange portion of the metal ring and the radial portion of the first sealing member and a second sealing lip extending from an inner-diameter end portion of the flange-shaped interposed portion towards the axial sealing liquid side and being positioned in a gap defined between the open-air side of the first sealing lip and the rotary member so that an inner peripheral portion of the second sealing member tightly, slidably contacts the surface of the rotary member;
    a first screw pump means provided on a sliding surface of the first sealing lip and adapted to provide a pumping function for transporting a liquid between sliding surfaces under an effect of a rotational sliding motion to the rotary member; and
    a spiral or ring-shaped second screw slot formed on the sliding surface of the second sealing lip extending from the sliding surface thereof to a bent portion continuous to the interposed portion.

2. A sealing apparatus according to claim 1, wherein said first screw pump means is composed of a plurality of screw grooves arranged in a circumferential direction and inclining in opposite directions from each other, and said second sealing member is provided with the second sealing lip to which said second screw slot is formed so as to provide a spiral shape having a prescribed pitch in the axial direction.

3. A sealing apparatus according to claim 1, wherein said first screw pump means is composed of a plurality of screw grooves arranged in a circumferential direction and inclining in opposite directions from each other and said second sealing member is provided with said second sealing lip to which said second screw slot is formed by a plurality of annular grooves having a prescribed pitch in the axial direction.

4. A sealing apparatus according to claim 1, 2 or 3, wherein said second screw slot formed on the second sealing lip has an inclination angle in a range of from 35 degrees to 75 degrees with respect to the sliding surface thereof and has a groove depth of less than 75% of a thickness of the second sealing lip.

5. A sealing apparatus according to claim 1, wherein said second sealing lip has a bent portion and wherein an annular recess is formed on a portion, opposite to the bent portion of the radial portion of the first sealing member from the interposed portion of the second sealing member.

6. A sealing apparatus according to claim 1, further comprising an auxiliary metal ring held between the interposed portion of said second sealing member and the radial portion of said first sealing member, said auxiliary metal ring having a support inserted between said first and second sealing lips so as to support the first sealing lip.

7. A sealing apparatus according to claim 1, wherein the interposed portion of said second sealing member is bonded to the radial portion and separable from the flange portion of the metal ring.

8. A sealing apparatus according to claim 1, wherein the interposed portion of said second sealing member is bonded to both the radial portion of the first sealing member and the flange portion of the metal ring.

9. A method of manufacturing a sealing apparatus which comprises: a metal ring having a cylindrical portion and an inward flange portion extending radially inward from an open-air side end of the cylindrical portion; a first sealing member made of an elastic rubber material, said first sealing member having a cylindrical portion in which the cylindrical portion of said metal ring is buried, and a radial portion disposed opposite to the inward flange portion of the metal ring, and a first sealing lip axially extending from the radial portion to a sealing liquid side and having a lip leading end tightly, slidably contacting a surface of the rotary member; a second sealing member made of a resin material, and having a flange-shaped interposed portion held between the inward flange portion of the metal ring and the radial portion of the first sealing member and a second sealing lip extending from an inner-diameter end portion of the flange-shaped interposed portion towards the axial sealing liquid side and being positioned in a gap defined between the open-air side of the first sealing lip and the rotary member so that an inner peripheral portion of the second sealing member tightly slidably contacts the surface of the rotary member; a first screw pump means provided on a sliding surface of the first sealing lip and adapted to provide a pumping function for transporting a liquid between sliding surfaces under an effect of a rotational sliding motion to the rotary member; and a spiral or ring-shaped second screw slot formed on the sliding surface of the second sealing member, said manufacturing method comprising the steps of:
    providing, in a forming mold, a guide section for guiding an inner periphery of a resin plate formed into a flat washer shape for forming the second sealing member;
    opening the forming mold;
    inserting the metal ring in the opened forming mold with the inward flange portion thereof directed downward;
    inserting the resin plate of the flat washer shape plate formed into the flat washer on the inward flange portion so as to position the inner-diameter end thereof through a guidance of the guide section;
    charging an elastic rubber raw material in the forming mold;
    closing the forming mold; and
    pressing and heating the forming mold to thereby form the first and second sealing members.

10. A manufacturing method according to claim 9, wherein an annular gap is formed between an outer-diameter end portion of the interposed portion of the second sealing member and an inner peripheral surface of the cylindrical portion of the metal ring.

11. A manufacturing method according to claim 9, wherein the inner-diameter end of the resin plate is folded to the axial sealing liquid side after the mold forming process.

* * * * *